(12) United States Patent
Lu

(10) Patent No.: US 11,875,473 B2
(45) Date of Patent: Jan. 16, 2024

(54) METHOD FOR GENERATING PROJECTION IMAGE WITH SCALING ADJUSTMENT AND SEAM CUT STITCHING

(71) Applicant: ASPEED Technology Inc., Hsinchu (TW)

(72) Inventor: Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 436 days.

(21) Appl. No.: 17/347,981

(22) Filed: Jun. 15, 2021

(65) Prior Publication Data

US 2022/0414822 A1 Dec. 29, 2022

(51) Int. Cl.
*G06T 3/00* (2006.01)
*H04N 23/698* (2023.01)
*G06T 3/40* (2006.01)
*H04N 23/80* (2023.01)

(52) U.S. Cl.
CPC .......... *G06T 3/0093* (2013.01); *G06T 3/0018* (2013.01); *G06T 3/4038* (2013.01); *H04N 23/698* (2023.01); *H04N 23/80* (2023.01)

(58) Field of Classification Search
CPC ..... G06T 3/0012; G06T 3/0018; G06T 3/005; G06T 3/0062; G06T 3/0068–0081; G06T 3/0093; G06T 3/4038; H04N 23/698; H04N 23/80; H04N 23/90; H04N 23/95; H04N 23/951; H04N 23/955; H04N 23/957; H04N 23/958; H04N 23/959; H04N 5/2628; H04N 9/3179; H04N 9/3185; G03B 37/04
See application file for complete search history.

(56) References Cited

U.S. PATENT DOCUMENTS 10,033,922 B1    7/2018  Tanner
10,810,700 B2   10/2020  Lu
2018/0227484 A1*  8/2018  Hung .................... G06T 3/0093
(Continued)

OTHER PUBLICATIONS

Sovetov, Kanat, Jun-Sik Kim, and Doik Kim. "Online Panorama Image Generation for a Disaster Rescue Vehicle." 2019 16th International Conference on Ubiquitous Robots (UR). IEEE, 2019. (Year: 2019).*

(Continued)

*Primary Examiner* — Geoffrey E Summers
(74) *Attorney, Agent, or Firm* — Muncy, Geissler, Olds & Lowe, P.C.

(57) ABSTRACT

An image processing method for receiving M lens images and generating a projection image is disclosed. The method comprises: determining P optimal warping coefficients of P control regions in the projection image according to a 2D error table and the M lens images from an image capture module; generating M projection images according to the M lens images, a first vertex list and the P optimal warping coefficients; determining a seam for each of N seam regions; and, stitching two overlapping seam images to generate a stitched seam image for each seam region according to its corresponding seam. The 2D error table comprises multiple test warping coefficients and multiple accumulation pixel value differences in the P control regions. The P control regions are respectively located in the N seam regions respectively located in N overlap regions, where $M \geq 2$, $N \geq 1$ and $P \geq 3$.

22 Claims, 16 Drawing Sheets

(56) References Cited

U.S. PATENT DOCUMENTS

| | | |
|---|---|---|
| 2018/0357804 A1 | 12/2018 | Forutanpour et al. |
| 2020/0074716 A1 | 3/2020 | Kaplan |
| 2020/0126182 A1* | 4/2020 | Cho .......................... G06T 5/50 |

OTHER PUBLICATIONS

Efros et al.; "Image quilting for texture synthesis and transfer"; Proceedings of SIGGRAPH '01; Aug. 2001; pp. 1-6;Los Angeles, California.

Li et al.; "Perception-based seam-cutting for image stitching", Signal, Image and Video Processing; Feb. 2018; pp. 1-8. vol 8.

Szeliski; "Image alignment and stitching: a tutorial", Foundations and Trends in Computer Graphics and Vision, pp. 1-105; 2006; vol. 2, No. 1.

* cited by examiner

METHOD FOR GENERATING PROJECTION IMAGE WITH SCALING ADJUSTMENT AND SEAM CUT STITCHING

BACKGROUND OF THE INVENTION

Field of the Invention

The invention relates to image processing, and more particularly, to a method for generating a projection image with scaling adjustment and seam cut stitching. The invention facilitates generation of projection images in image processing system.

Description of the Related Art

FIG. 1A shows a relation between a cube framework and a sphere. Referring to FIG. 1A, a conventional multiple-lens camera includes four lens respectively mounted on four faces (right, left, front, back) of a cube framework 11. Any two adjacent faces of the four faces are substantially orthogonal, such as facing toward 0°, 90°, 180°, 270° of longitude of the virtual sphere 12, respectively, to simultaneously capture a view with a 360-degree horizontal FOV and a 90-degree vertical FOV to generate four lens images. A requirement for the four lens is that there should be sufficient overlaps between the views of two adjacent lenses, so as to facilitate image mosaicking. Referring to FIG. 1B, pixels in regions A(1)~A(4) are overlapping by two lens/texture images while pixels in regions 15 comes from a single lens/texture image. Stitching operations over the overlap regions A(1)~A(4) are performed to form an equirectangular panoramic image.

An ideal projection image processing system should leave a viewer unaware that multiple lenses captured the video. Thus, the viewer has a seamless experience in which multiple lenses appear as a single lens.

SUMMARY OF THE INVENTION

In view of the above-mentioned problems, an object of the invention is to provide an image processing method for facilitating generation of projection images with optimal scaling and seam cut stitching.

One embodiment of the invention provides an image processing method that receives M lens images and generates a projection image. The image processing method comprises: determining P optimal warping coefficients of P control regions in projection image according to a 2D error table and the M lens images from an image capture module that captures a X-degree horizontal field of view and a Y-degree vertical field of view; generating M face images according to the M lens images, a first vertex list and the P optimal warping coefficients; determining a seam for each of N seam regions; and, stitching two overlapping seam images for each seam region to generate a stitched seam image according to its corresponding seam. Each face image comprises z seam images and a main image, and each seam region is located between two neighboring main images in the projection image. The 2D error table comprises multiple test warping coefficients and corresponding multiple accumulation pixel value differences in the P control regions. The P control regions are respectively located in the N seam regions that are respectively located in N overlap regions of the M face images. Here, the first vertex list comprises a plurality of first vertices with their first data structures that define a first vertex mapping between one lens image and the projection image, where $1 \Leftarrow z \Leftarrow 2$, $M \geq 2$, $N \geq 1$, $P \geq 3$, $X \geq 360$ and $Y < 180$.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1B:
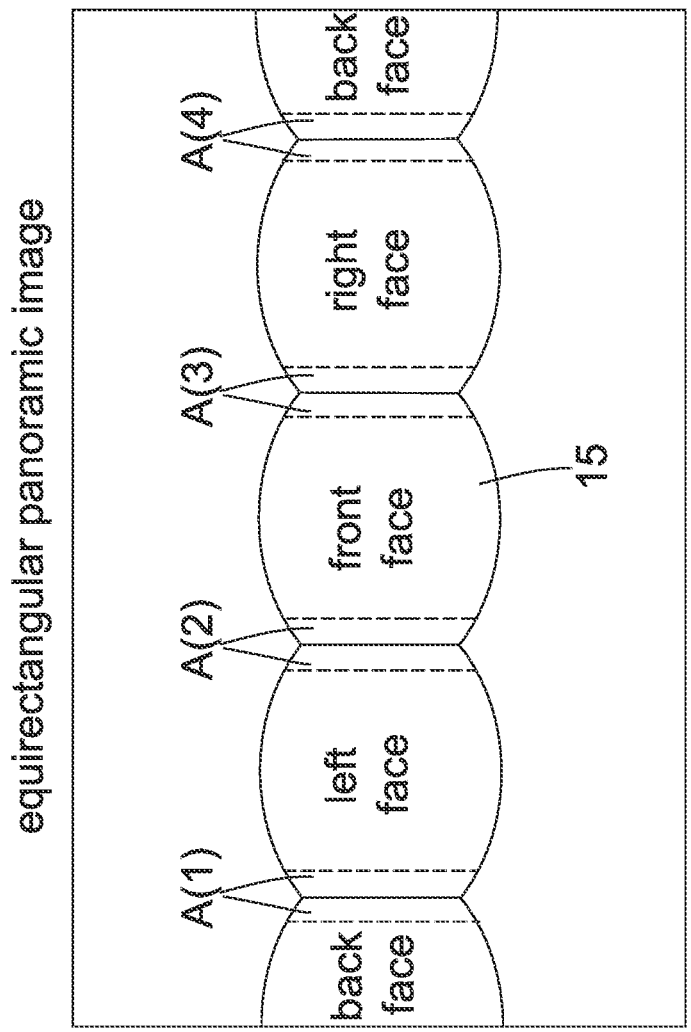
FIG. 1B shows an equirectangular panoramic image derived from an equirectangular projection of four-face lens images (right, left, front, back) from the image capture module 21.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

Figure 2:
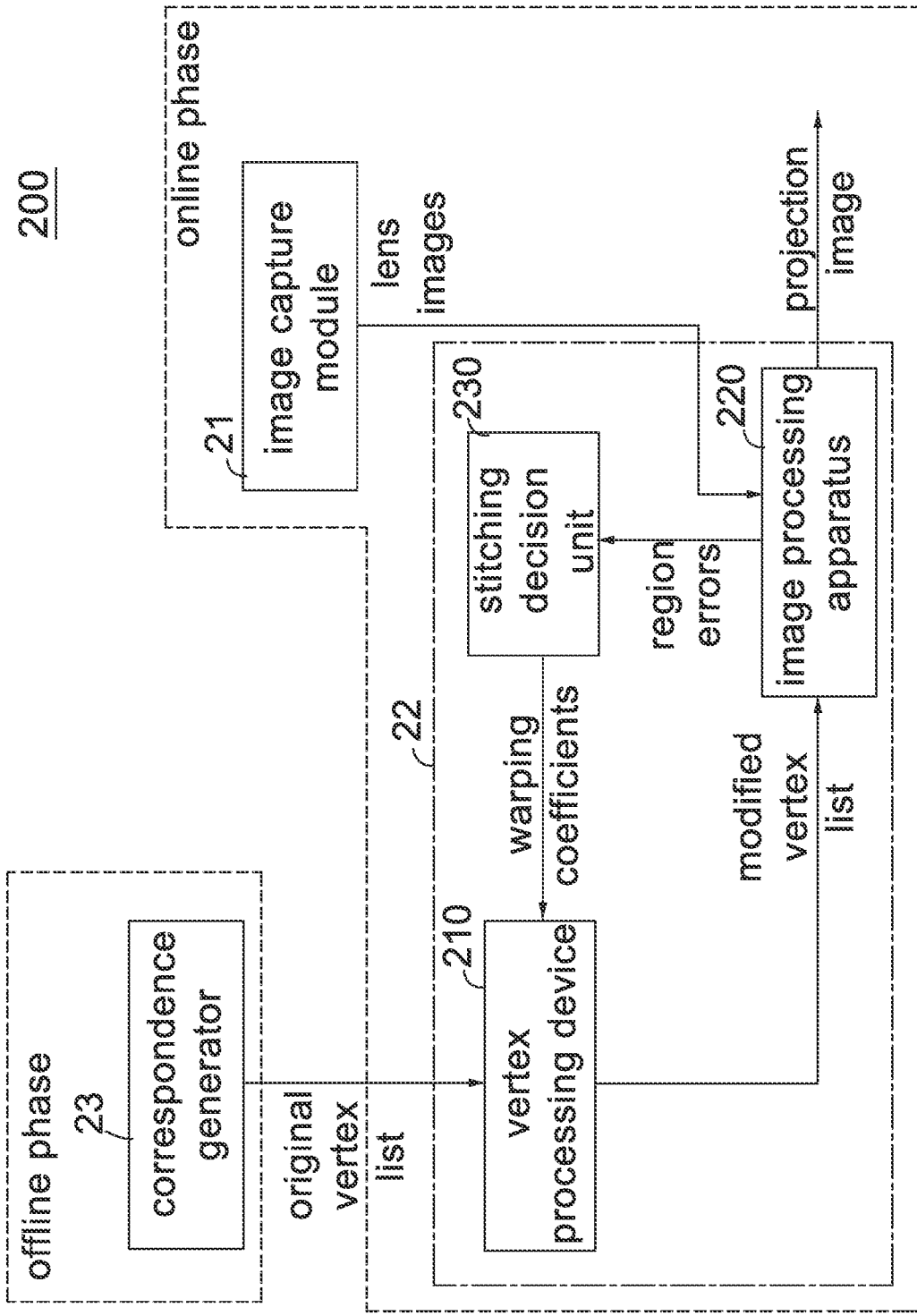
FIG. 2 is a block diagram showing a projection image processing system according to an embodiment of the invention.

FIG. 2 is a block diagram showing a projection image processing system according to an embodiment of the invention. Referring to FIG. 2, the projection image processing system 200 includes an image capture module 21, a compensation device 22 and a correspondence generator 23. The compensation device 22 receives an original vertex list from the correspondence generator 23 and multiple lens images from the image capture module 21 and generates a projection image. Please note that a multiple-lens camera included in the image capture module 21 may be a panoramic camera or a wide-angle camera, and accordingly the projection image may be a wide-angle image or a panoramic image.

A wide variety of projections are suitable for use in the projection image processing system 200 of the invention. The term "projection" refers to flatten a globe's surface into a 2D plane, e.g., a projection image. The projection includes, without limitations, equirectangular projection, cylindrical projection and modified cylindrical projection. The modified cylindrical projection includes, without limitations, Miller projection, Mercator projection, Lambert cylindrical equal area projection and Pannini projection. Thus, the projection image includes, without limitations, an equirectangular panoramic image, a cylindrical projection image and a modified cylindrical projection image. FIGS. 1A-1B and 3A-3C are associated with equirectangular projection. The implementations of the cylindrical projection and the modified cylindrical projection are well known to those skilled in the art and thus will not be described herein. Please note that whichever projection is used in the projection image processing system 200, the correspondence generator 23 would correspondingly generate an original vertex list (such as Table 1) that define the vertex mapping between the lens image images and the projection image. For purpose of clarity and ease of description, the following examples and embodiments are described with reference to equirectangular projection and equirectangular panoramic images. The operations of the projection image processing system 200 and the image processing method (FIGS. 6A-6B, 7C, 8A) are also applicable to the wide-angle camera, the cylindrical projection and the modified cylindrical projection.

Figure 1A:
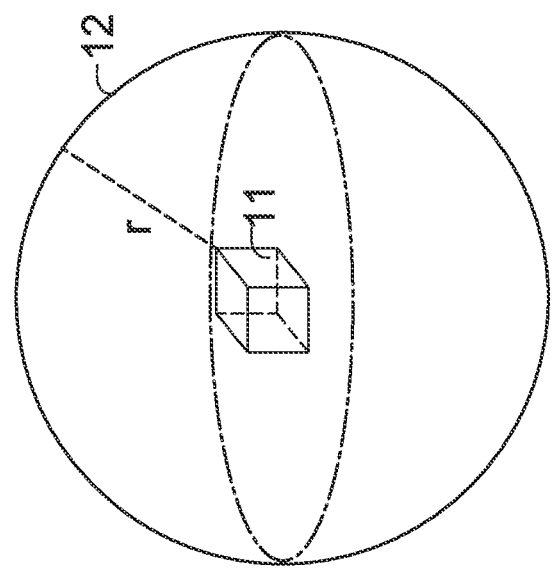
FIG. 1A shows a relation between a cube framework and a sphere.

The image capture module 21 is a multiple-lens camera, which is capable of simultaneously capturing a view with a X-degree horizontal FOV and a Y-degree vertical FOV to generate a plurality of lens images, where X<=360 and Y<180, e.g., 360×160 or 180×90 etc. For example, as shown in FIG. 1A, the image capture module 21 includes four lenses (not shown) respectively mounted on the four faces of a cube framework 11 to simultaneously capture a view of the world with 360-degree horizontal FOV and 90-degree vertical FOV to generate four lens images. Please note that the number of the lenses is not limited as long as it is sufficient for the lenses to capture a view with a X-degree horizontal FOV and a Y-degree vertical FOV, where X<=360 and Y<180. A requirement is that there should be sufficient overlaps between the views of any two adjacent lenses to facilitate image mosaicking.

Throughout the specification and claims, the following terms take the meanings explicitly associated herein, unless the context clearly dictates otherwise. The term "texture coordinates" refers to coordinates in a texture space (such as a lens/texture image). The term "rasterization" refers to a process of computing the mapping from scene geometry (or a projection image) to texture coordinates of each lens image.

The processing pipeline for the projection image processing system 200 is divided into an offline phase and an online phase. In the offline phase, the four lenses of the image capture module 21 are calibrated separately. The correspondence generator 23 adopts appropriate image registration techniques to generate an original vertex list, and each vertex in the original vertex list provides the vertex mapping between the equirectangular panoramic image and lens images (or between the equirectangular coordinates and the texture coordinates). For example, the sphere 12 with 2-meter radius (r=2) is drawn in many circles as latitude and longitude, whose intersection points are treated as calibration points. The four lenses capture these calibration points, and their positions on lens images are known. Then the mapping relationship between the equirectangular panoramic image and lens images are constructed since the view angles of the calibration points and texture coordinates are linked. A calibration point with the mapping relationship is defined as a "vertex" in this invention. In brief, the correspondence generator 23 conducts calibration between the lens images and the equirectangular panoramic image for the vertices to obtain the original vertex list. The correspondence generator 23 completes all necessary computations in the offline phase.

Figure 3B:
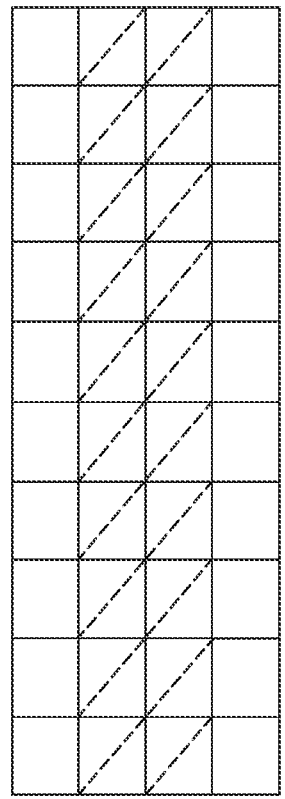
FIG. 3B shows a polygon mesh composing/modeling the equirectangular panoramic image.
Figure 3A:
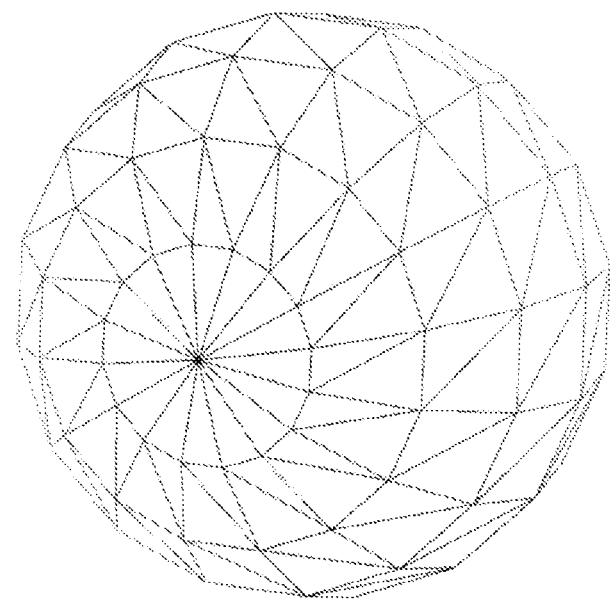
FIG. 3A shows a triangle mesh modeling a surface of the sphere 22.

FIG. 3A shows a triangle mesh modeling a sphere surface. The surface of the sphere 12 is modeled by using a triangle mesh as shown in FIG. 3A. FIG. 3B shows a polygon mesh composing/modeling the equirectangular panoramic image. The polygon mesh of FIG. 3B is produced by performing an equirectangular projection of the triangle mesh of FIG. 3A. The polygon mesh in FIG. 3B is a collection of quadrilaterals and/or triangles.

According to the geometry of the equirectangular panoramic image and lens images, the correspondence generator 23 in offline phase computes equirectangular coordinates and texture coordinates for each vertex in the polygon mesh to generate an original vertex list. Afterward, the correspondence generator 23 supplies the original vertex list to the vertex processing device 210. The original vertex list is a list of a plurality of vertices forming a plurality of quadrilaterals and/or triangles of the polygon mesh (FIG. 3B) and each vertex is defined by its corresponding data structure. The data structure defines a vertex mapping between a destination space and a texture space (or between the equirectangular coordinates and the texture coordinates). Table 1 shows an exemplary data structure of each vertex in the original vertex list.

TABLE 1

| Attributes | Descriptions |
|---|---|
| (x, y) | Equirectangular coordinates |
| N | Number of covering/overlapping lens images |
| $ID_1$ | ID of first lens image |
| $(u_1, v_1)$ | Texture coordinates in first lens image |
| $(idx_{10}, idx_{11})$ | Warping coefficient indices in first lens image |
| $Alpha_1$ | Blending weight for warping coefficients in first lens image |
| ... | ... |
| $ID_N$ | ID of $N^{th}$ lens image |
| $(u_N, v_N)$ | Texture coordinates in $N^{th}$ lens image |
| $(idx_{N0}, idx_{N1})$ | Warping coefficient indices in $N^{th}$ lens image |
| $Alpha_N$ | Blending weight for warping coefficients in $N^{th}$ lens image |

For purposes of clarity and ease of description, hereinafter, the following examples and embodiments will be described with the assumption that the image capture module 21 includes four lenses respectively mounted on the four faces (right, left, front, back) of the cube framework 11.

Figure 3C:
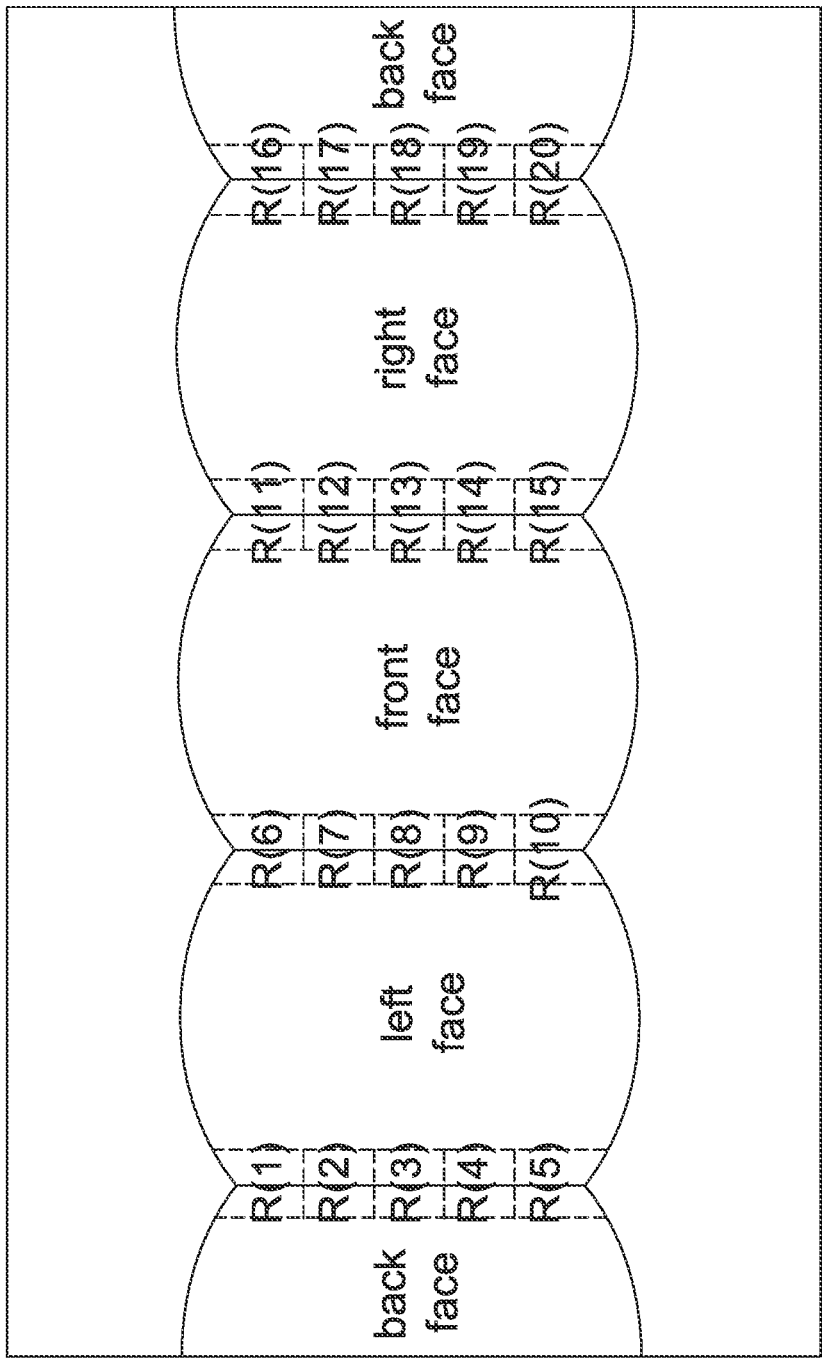
FIG. 3C shows an exemplary equirectangular panoramic image with four overlap regions containing twenty control regions R(1)~R(20).

FIG. 3C shows an exemplary equirectangular panoramic image with four overlap regions containing twenty control regions R(1)~R(20). Referring also to FIG. 1B, each of the four overlap regions A(1)~A(4) contains P1 control regions, where P1>=3. The following examples and embodiments will be described with five (P1=5) control regions in each overlap region of the equirectangular panoramic image. In the example of FIG. 3C, there are twenty control regions R(1)~R(20) in the equirectangular panoramic image, and the twenty control regions R(1)~R(20) respectively have twenty warping coefficients C(1)~C(20). The warping coefficients C(1)~C(20) respectively denote different warping degrees for the control regions R(1)~R(20).

The compensation device 22 includes a vertex processing device 210, a stitching decision unit 230 and an image processing apparatus 220. In a measure mode, the vertex processing device 210 receives the original vertex list and test warping coefficients C(1)~C(20) from the stitching decision unit 230, modifies all the texture coordinates of all lens images for each vertex from the original vertex list on a vertex-by-vertex basis and generates a modified vertex list (will be described below). According to the modified vertex list and four lens images from the image capture module 21, the image processing apparatus 220 measures twenty region errors E(1)~E(20) of twenty control regions R(1)~R(20) in the equirectangular panoramic image, and outputs the twenty region errors; accordingly, the stitching decision unit 230 receives the twenty region errors E(1)~E(20) and the test warping coefficients to form a 2D error table; then, according to the 2D error table, the stitching decision unit 230 generates the corresponding twenty optimal warping coefficients C(1)~C(20) for the twenty control regions R(1)~R(20). On the other hand, in the rendering mode, the stitching decision unit 230 is disabled; thus, the vertex processing device 210 and the image processing apparatus 220 operate together to generate equirectangular panoramic images based on the twenty optimal warping coefficients from the stitching decision unit 230.

Figure 4A:
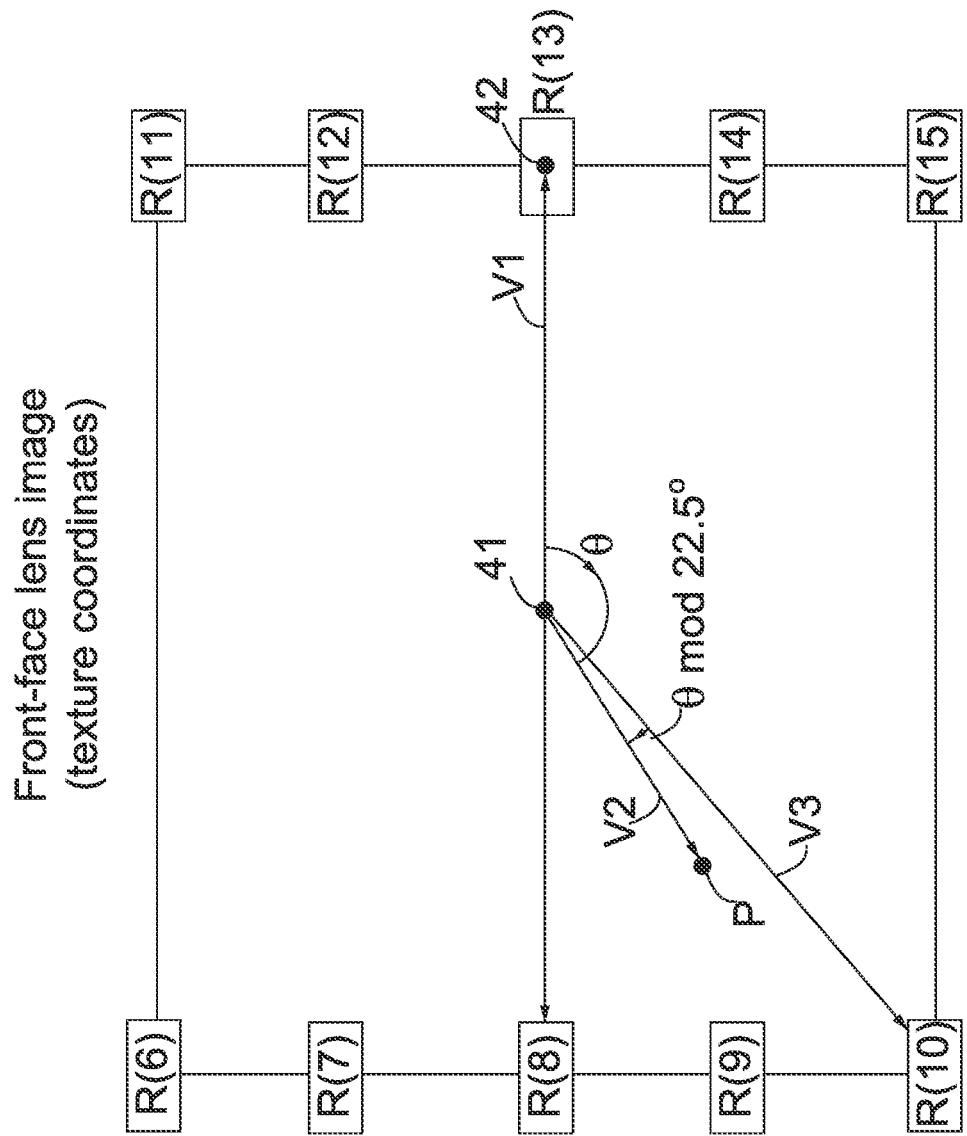
FIG. 4A is an example showing a relation between the target vertex P and ten control regions R(6)~R(15) in the front-face lens image.

In measure or rendering mode, the vertex processing device 210 receives a target vertex P (with its data structure) from the original vertex list and twenty test/optimal warping coefficients C(1)~C(20) from the stitching decision unit 230. Then, the vertex processing device 210 sequentially performs interpolation operations over two of the twenty test/optimal warping coefficients C(1)~C(20) according to original texture coordinates of the target vertex P to generate an interpolated warping coefficient C' for each lens image associated with the target vertex P. Take the front-face lens image for example. Assuming that the target vertex P has original texture coordinates $(u_p, v_p)$ in the front-face lens image according to the original vertex list. FIG. 4A is an example showing a relation between the target vertex P and ten control regions R(6)~R(15) in the front-face lens image. In the example of FIG. 4A, the ten control regions (R(6)~R(15)) in the front-face lens image respectively have ten test/optimal warping degrees/coefficients of (C(6)~C(15)). In one embodiment, the vertex processing device 210 generates the interpolated warping coefficient C' for the target vertex P with original texture coordinates $(u_p, v_p)$ in the front-face lens image by performing interpolation operation over two test/optimal warping coefficients of its two immediately-adjacent control regions according to an angle θ. Here, the angle θ is clockwise and formed between a first vector V1 starting from the image center 41 (with texture coordinates $(u_{center}, v_{center})$) to the location 42 of a starting control region R(13) and a second vector V2 starting from the image center 41 to the target vertex $P(u_p, v_p)$. Given that θ=119.5°, because there are five control regions on each of the right side and the left side of the front-face camera, then 90°/4=22.5°, idx=θ/22.5°=5 and θ mod 22.5°=θ−idx×22.5°=7°. Thus, its two immediately-adjacent control regions are R(9) and R(10) and the interpolated warping coefficient C' for the target vertex P in the front-face lens image is defined/calculated by the following equation: C'=C(9)×(7/22.5)+C(10)×(1−7/22.5). Examples of the location 42 of the control region include, without limitation, a gravity center of the control region, a region center of the control region, and a median point of the control region. Please note that the starting control region R(13) is provided by example and not limitation of the invention. In an alternative embodiment, another control region, such as R(11), can be selected as the starting control region as long as the rotation of the angle θ is clockwise and measured from the first vector V1 (pointing to the starting control region R(11)) to the second vector V2.

To simplify the above calculation, in offline phase, the correspondence generator 23 pre-determines which two control regions (i.e., R(9) and R(10)) are immediately adjacent to the target vertex P and writes their indices (9 and 10) to the "warping coefficient indices" field of the data structure of the target vertex P in the original vertex list; besides, the correspondence generator 23 additionally pre-calculates a blending weight (=7/22.5) for warping coefficients (C(9) and C(10)) and writes it to the "Alpha" field in the front-face lens image of the data structure of the target vertex P in the original vertex list. Please note that the test/optimal warping coefficients (C(1) to C(20)) outputted from the stitching decision unit 230 are arranged as a 1-D warping coefficient array or a 1-D data stream. After receiving the original vertex list, the vertex processing device 210 simply retrieves two warping coefficients (C(9) and C(10)) from the 1-D warping coefficient array based on the "warping coefficient indices" field (i.e., 9 and 10) in the front-face lens image for the target vertex P and calculates the interpolated warping coefficient C' based on the "Alpha" field (i.e., 7/22.5) in the front-face lens image for the target vertex P (see Table 1).

After receiving the interpolated warping coefficient C', the vertex processing device 210 calculates modified texture coordinates (u'p, v'p) in the front-face lens image for the target vertex P according to the following equations: $u'_p = (u_p - u_{center})*C' + u_{center}$; $v'_p = (v_p - v_{center})*C' + v_{center}$. In this manner, the original texture coordinates $(u_p, v_p)$ of the target vertex P is changed to the modified texture coordinates (u'p, $v'_p$) in the front-face camera. Likewise, the vertex processing device 210 sequentially modifies all the texture coordinates in the four lens images based on each vertex from the original vertex list according to the twenty test/optimal warping coefficients C(1)~C(20) to generate a modified vertex list. Table 2 shows an exemplary data structure of each vertex in the modified vertex list.

TABLE 2

| Attributes | Descriptions |
|---|---|
| (x, y) | Equirectangular coordinates |
| N | Number of covering/overlapping lens images |
| $ID_1$ | ID of first lens image |
| $(u'_1, v'_1)$ | Modified texture coordinates in first lens image |
| ... | ... |
| $ID_N$ | ID of $N^{th}$ lens image |
| $(u'_N, v'_N)$ | Modified texture coordinates in $N^{th}$ lens image |

Figure 4B:
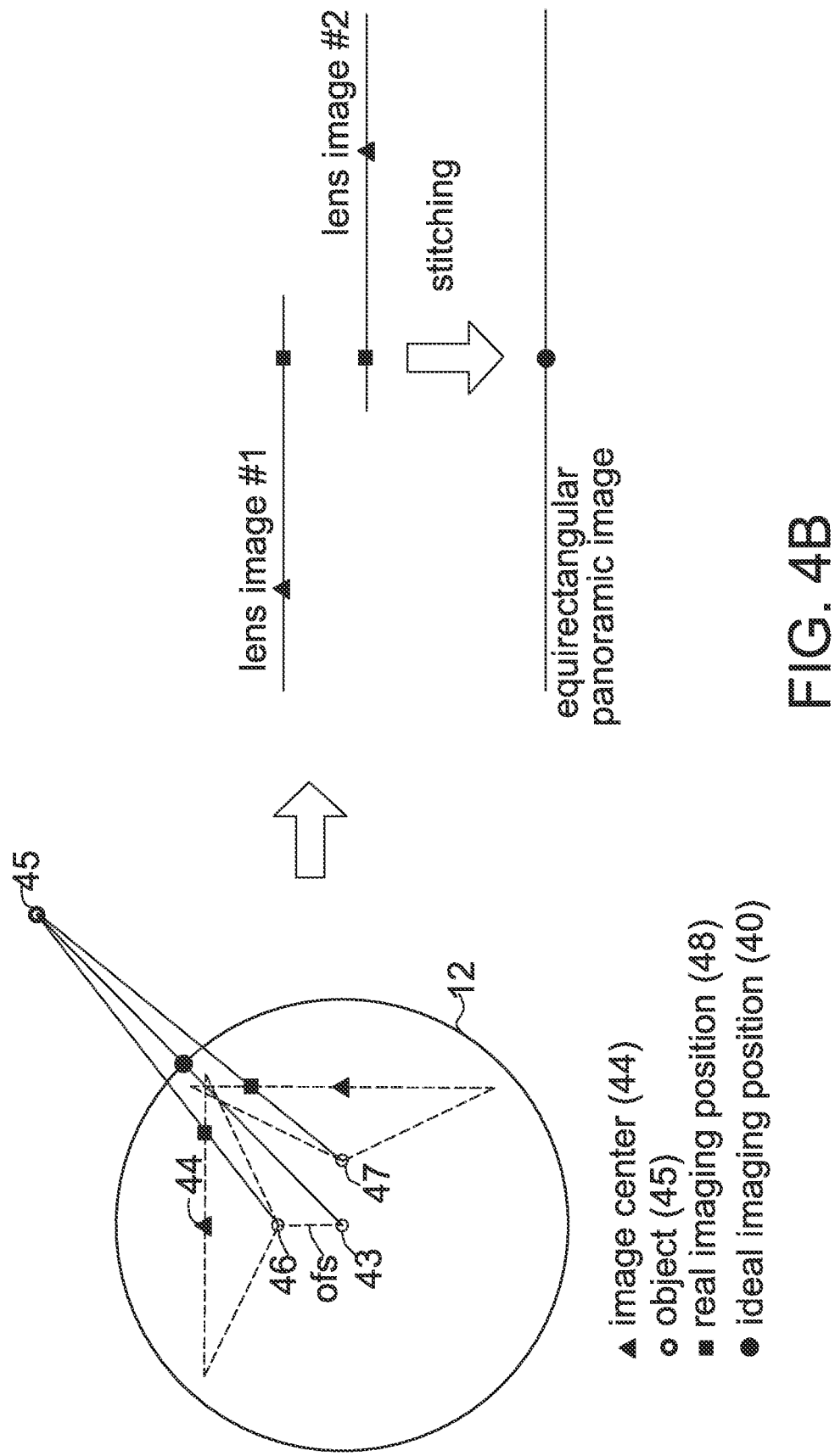
FIG. 4B shows how a mismatch image defect is improved for an object case after all the texture coordinates of all vertices are modified according to warping coefficients by the vertex processing device 210.

After all the texture coordinates of all vertices are modified according to test/optimal warping coefficients (C(1)~C(20)) by the vertex processing device 210, the mismatch image defects caused by shifted lens centers of the image capture module 21 (e.g., a lens center 46 is separated from the system center 43 by an offset ofs) would be greatly improved (i.e., the real imaging positions 48 are pulled toward the idea imaging positions 40) as shown in FIG. 4B. Please note that since the sphere 12 is virtual, the object 45 may be located outside, inside the sphere 12 or on the surface of the sphere 12.

Figure 5:
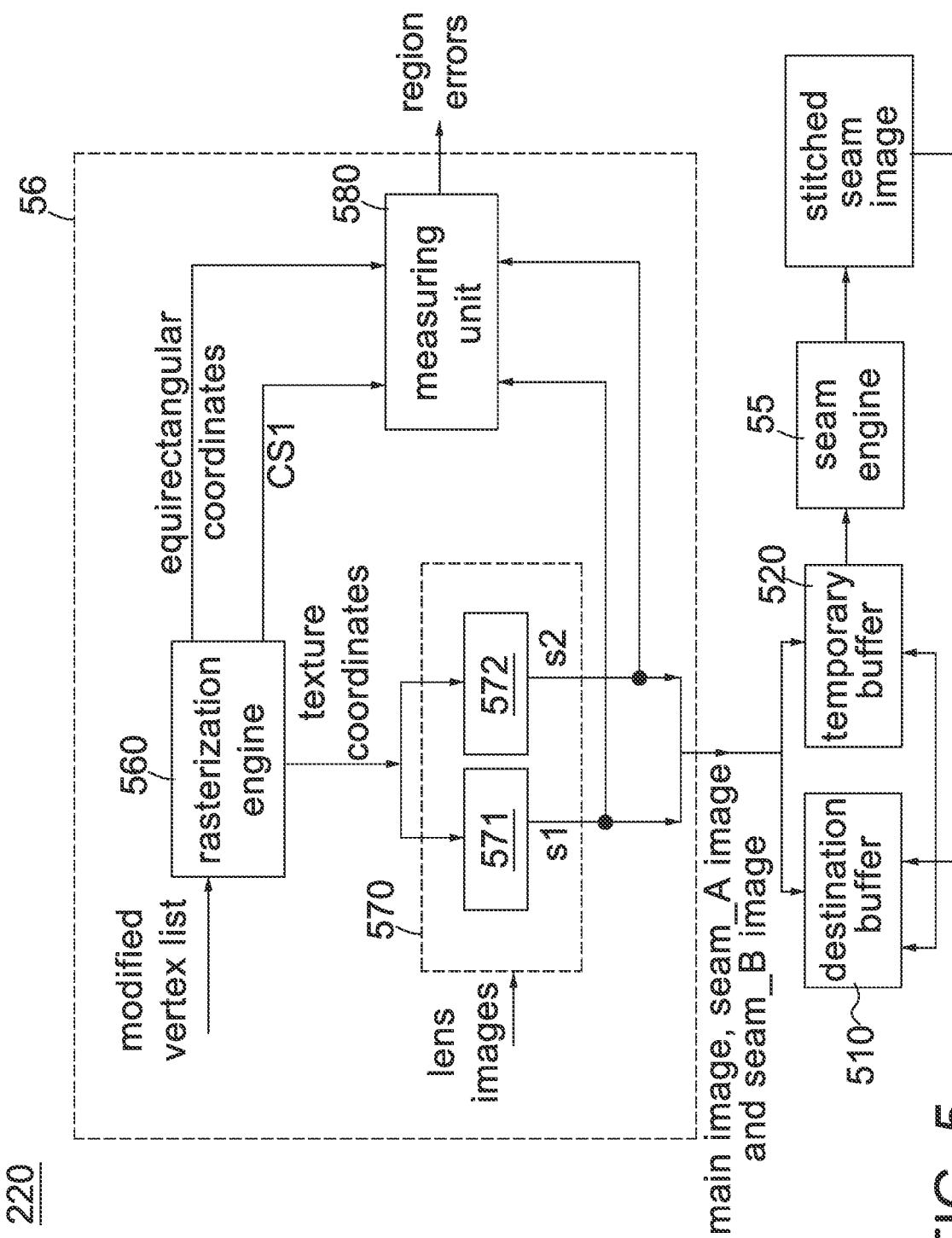
FIG. 5 is a schematic diagram showing the image processing apparatus according to one embodiment of the invention.

After receiving the modified vertex list and the four lens images, the image processing apparatus 220 either generates region errors E(1)~E(20) for the twenty control regions (R(1)~R(20)) in the measure mode or generates an equirectangular panoramic image in the rendering mode. FIG. 5 is a schematic diagram showing the image processing apparatus according to one embodiment of the invention. Referring to FIG. 5, the image processing apparatus 220 includes a graphics engine 56, a destination buffer 510, a temporary buffer 520 and a seam engine 55. The graphics engine 56 includes a rasterization engine 560, a texture mapping circuit 570, and a measuring unit 580. The texture mapping circuit 570 includes two texture mapping engines 571~572. As shown in FIG. 3B, the polygon mesh is a collection of quadrilaterals and/or triangles. Thus, the rasterization engine 560 may perform quadrilateral rasterization for each point/pixel in each quadrilateral in FIG. 3B formed by each group of four vertices from the modified vertex list, or perform triangle rasterization for each point/pixel in each triangle in FIG. 3B formed by each group of three vertices from the modified vertex list.

For a quadrilateral case, assuming each of four vertices (A, B, C, D) (forming one quadrilateral of the polygon mesh) from the modified vertex list is located in one of the control regions and is overlapped with two-face lens images (front, right; N=2), the four vertices (A, B, C, D) have the following data structures contained in the vertex list: vertex A:$\{(x_A, y_A), 2, ID_{Front}, (u_{1A}, v_{1A}), ID_{Right}, (u_{2A}, v_{2A})\}$, vertex B:$\{(x_B, y_B), 2, ID_{Front}, (u_{1B}, v_{1B}), ID_{Right}, (u_{2B}, v_{2B})\}$, vertex C:$\{(x_C, y_C), 2, ID_{Front}, (u_{1C}, v_{1C}), ID_{Right}, (u_{2C}, v_{2C})\}$, vertex D:$\{(x_D, y_D), 2, ID_{Front}, (u_{1D}, v_{1D}), ID_{Right}, (u_{2D}, v_{2D})\}$. The rasterization engine 560 directly performs quadrilateral rasterization operations for the quadrilateral ABCD. Specifically, the rasterization engine 560 computes texture coordinates for each lens image based on a point Q having equirectangular coordinates (x, y) within a quadrilateral ABCD of the polygon mesh by using the following steps: (1) Compute four spatial weighting values (a,b,c,d) according to equirectangular coordinates ($x_A$, $y_A$, $x_B$, $y_B$, $x_C$, $y_C$, $x_D$, $y_D$, x, y) by using a bi-linear interpolation method. (2) compute texture coordinates for the sample point $Q_F$ (corresponding to point Q) in front-face lens image: (u1,v1)=($a*u_{1A}+b*u_{1B}+c*u_{1C}+d*u_{1D}$, $a*v_{1A}+b*v_{1B}+c*v_{1C}+d*v_{1D}$), compute texture coordinates for the sample point $Q_R$ (corresponding to point Q) in right-face lens image: (u2,v2)=($a*u_{2A}+b*u_{2B}+c*u_{2C}+d*u_{2D}$, $a*v_{2A}+b*v_{2B}+c*v_{2C}+d*v_{2D}$). Finally, the rasterization engine 560 sends the two texture coordinates (u1, v1) and (u2, v2) to the two texture mapping engines 571~572 in parallel. Here, a+b+c+d=1. According to the two texture coordinates (u1, v1) and (u2, v2), the texture mapping engines 571~572 texture map the texture data from the front-face and right-face lens images using any appropriate method (such as nearest-neighbour interpolation, bilinear interpolation or trilinear interpolation) to generate two sample values s1 and s2. Here, the sample value (s1~s2) may be a luma value, a chroma value, an edge value, a pixel color value (RGB), or a motion vector.

For a triangle case, the rasterization engine 560 and the texture mapping engines 571~572 perform similar operations to the above quadrilateral case for each point/pixel in a triangle formed by each group of three vertices from the modified vertex list to generate two corresponding sample values s1 and s2, except that the rasterization engine 560 computes three spatial weighting values (a,b,c) for three input vertices (A, B, C) according to equirectangular coordinates ($x_A$, $y_A$, $x_B$, $y_B$, $x_C$, $y_C$, x, y) by using a barycentric weighting method, rather than by using a bi-linear interpolation method in step (1).

In measure mode, the measuring unit 580 estimates/measures region errors E(1)~E(20) for the twenty control regions R(1)~R(20) in the equirectangular panoramic image according to the equirectangular coordinates (x, y) of the point Q and the two sample values (s1~s2). According to the equirectangular coordinates (x, y), the measuring unit 580 determines whether the point Q falls in one of the twenty control regions (referring to FIG. 3C) and then starts to estimate/measure the region error of the control region if the point Q falls in the control region. The measuring unit 580 may estimate/measure the region errors of the control regions by using known algorithms, such as SAD (sum of absolute differences), SSD (sum of squared differences), MAD (median absolute deviation), etc. For example, if the point Q is determined to fall in control region R(11), the measuring unit 580 may accumulate the absolute value of the sample value difference between each point in the control region R(11) of the right-face lens image and its corresponding point in the control region R(11) of the front-face lens image to obtain the SAD value as the region error E(11) for the control region R(11), by using the following equations: E=|s1−s2|, E(11)+=E. In this manner, the measuring unit 580 measures twenty region errors E(1)~E(20) for the twenty control regions R(1)~R(20).

Figure 6A:
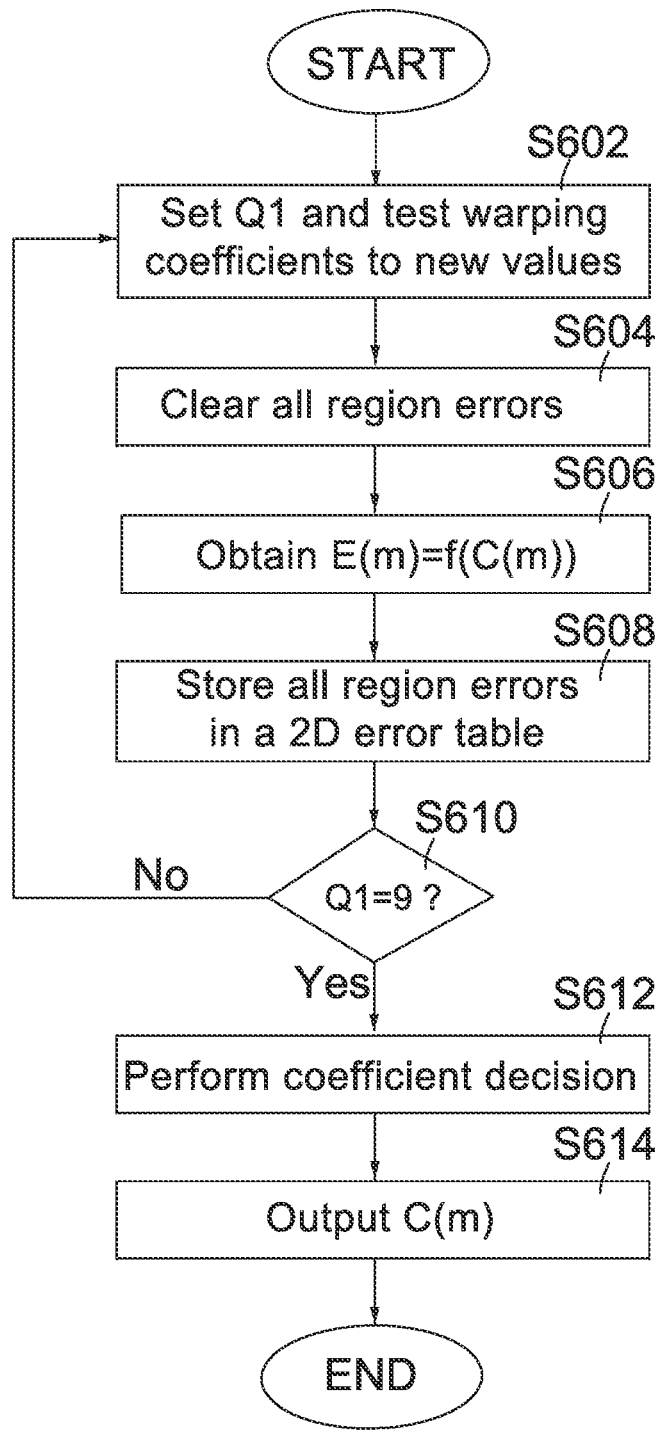
FIG. 6A is a flow chart showing operations of the stitching decision unit 230 in a measure mode according to an embodiment of the invention.

A feature of the invention is to minimize the mismatch image defect within a predefined number of loops (e.g., Q1 in FIG. 6A). The predefined number of loops are associated with an offset ofs that a lens center 46 is separated from the system center 43 (see FIG. 4B) in the image capture module 21.

Referring back to FIG. 2, in measure mode, the stitching decision unit 230 sets the twenty warping coefficients C(1)~C(20) to different value ranges for measuring the region errors E(1)~E(20) according to the offset ofs in FIG. 4B, and the twenty warping coefficients are set to the same value at a time (or for each round). For example, in a case of ofs=3 cm, the twenty test warping coefficients C(1)~C(20) are set to values ranging from 0.96 to 1.04 and there would be nine times of measurement if each increment is 0.01; in a case of ofs=1 cm, the twenty test warping coefficients C(1)~C(20) are set from 0.99 to 1.00 and there would be ten times of measurement if each increment is 0.001.

FIG. 6A is a flow chart showing a method of determining the optimal warping coefficients for all control regions according to an embodiment of the invention. Hereinafter, the method of determining the optimal warping coefficients for all control regions, applicable to the stitching decision unit 230 in measure mode, is described with reference to FIGS. 4B, 5 and 6A and with the assumption that ofs=3 cm.

Step S602: Respectively set the Q1 number of iterations and test warping coefficients to new values. In one embodiment, set the Q1 number of iterations to 1 in a first round and increment Q1 by 1 in each of the following rounds; if ofs=3 cm, set all the test warping coefficients C(1)~C(20) to 0.96 in a first round (i.e., C(1)= . . . =C(20)=0.96), and then set them to 0.97, . . . , 1.04 in order in the following rounds.

Step S604: Clear all region errors E(m), where m=1, 2, . . . , 20.

Step S606: Measure/obtain region errors E(1)~E(20) for the twenty control regions R(1)~R(20) in the equirectangular panoramic image by the graphics engine 56 of the image processing apparatus 220 after the operations of the vertex processing device 210 are done base on the test warping coefficients set by Step S602. For ease of description, this step S606 is denoted by E(m)=f(C(m)), where m=1, 2, . . . , 20; f( ) denotes a function that measures the region error E(m) (by the graphics engine 56) based on its corresponding test warping coefficient C(m) and the four lens images from the image capture module 21.

Step S608: Store all region errors E(1)~E(20) in a 2D error table. Table 3 shows an exemplary 2D error table for ofs=3 cm (test warping coefficients ranging from 0.96 to 1.04).

TABLE 3

|  | 1st | 2nd | 3rd | — | 7th | 8th | 9th |
|---|---|---|---|---|---|---|---|
| Test warping coefficient | 0.96 | 0.97 | 0.98 | — | 1.02 | 1.03 | 1.04 |
| E(1) |  |  |  |  |  |  |  |
| E(2) |  |  |  |  |  |  |  |
|  |  |  |  | — |  |  |  |
| E(17) |  |  |  | — |  |  |  |
| E(18) |  |  |  |  |  |  |  |
| E(19) |  |  |  |  |  |  |  |
| E(20) |  |  |  |  |  |  |  |

In Table 3, there are twenty region errors E(1)~E(20) and nine test warping coefficients. Due to the fact that its data volume is huge, however, Table 3 shows only eight region errors and six test warping coefficients and the others are skipped for the sake of brevity. Please note that the numbers of region errors and test warping coefficients in the 2D error table are provided by way of example and not limitations of the invention. In the actual implementation, any other numbers of region errors and test warping coefficients can be used in the 2D error table.

Step S610: Determine whether the Q1 number of iterations reaches a limit value of 9. If YES, the flow goes to step S612; otherwise, the flow goes to Step S602.

Step S612: Perform coefficient decision according to the 2D error table.

Step S614: Output optimal warping coefficients C(m), where m=1, 2, . . . , 20. In rendering mode, the optimal warping coefficients C(1)~C(20) are outputted to the vertex processing device 210 so that the image processing apparatus 220 generates a corresponding equirectangular panoramic image.

Figure 6B:
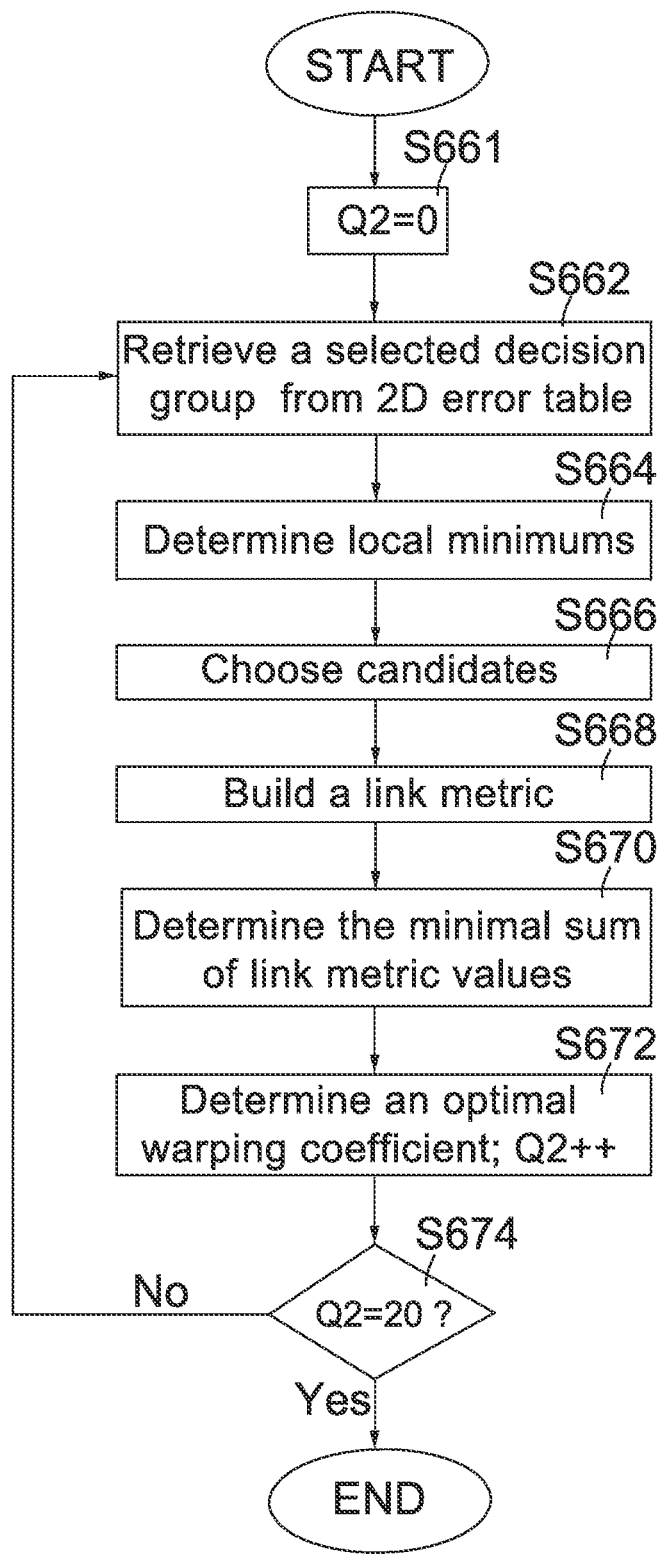
FIG. 6B is a flow chart showing the detailed operations of performing the coefficient decision in step S612 by the stitching decision unit 230 according to an embodiment of the invention.

FIG. 6B is a flow chart showing the detailed operations of performing the coefficient decision in step S612 by the stitching decision unit 230 according to an embodiment of the invention. Hereinafter, the operations of performing the coefficient decision are described with reference to FIGS. 3C and 6A-6B.

Step S661: Set Q2 to 0 for initialization.

Figures 7A, 7B:
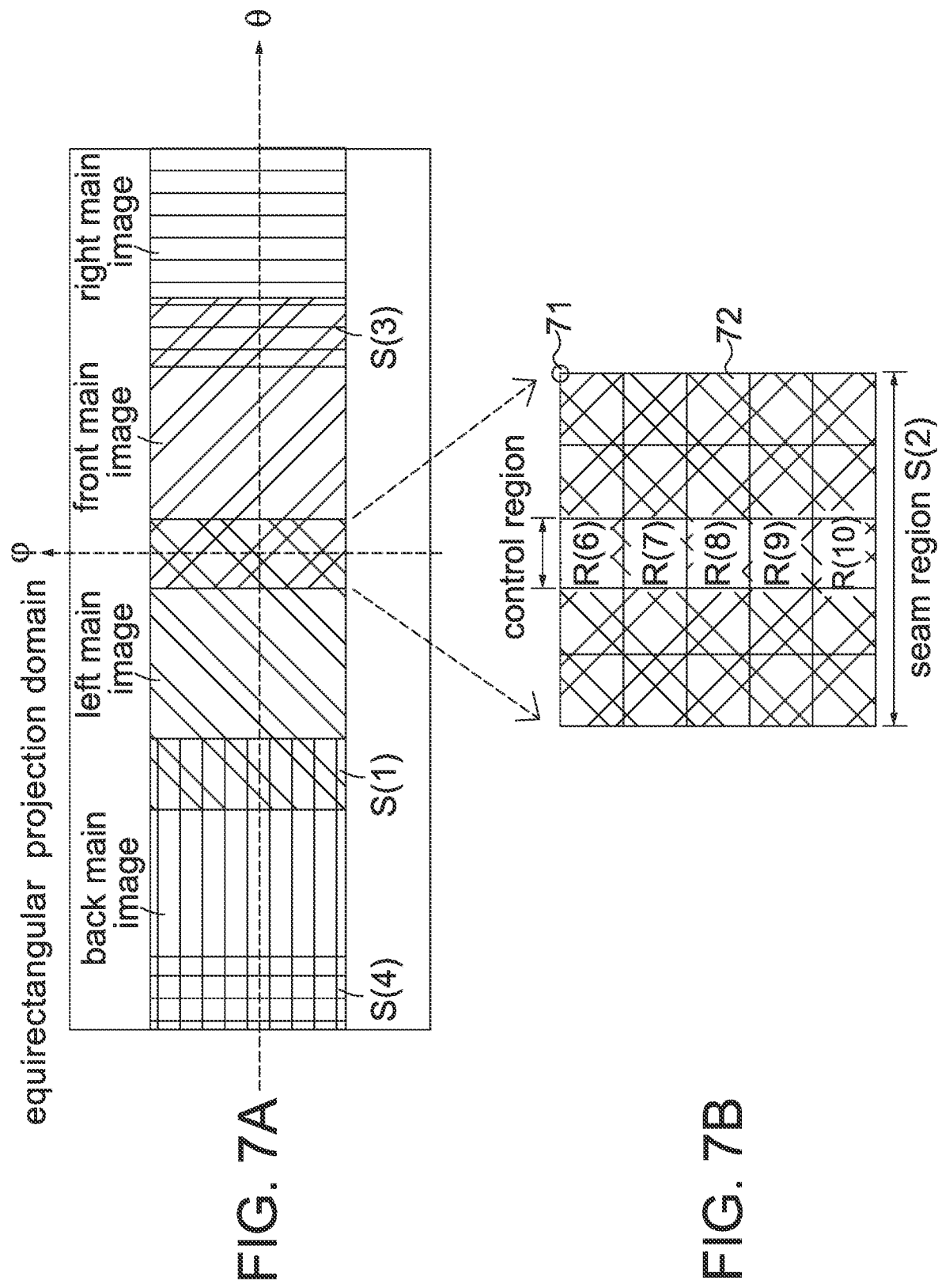
FIG. 7A shows an example of four main images and four seam regions S(1)~S(4) in the equirectangular projection domain.
FIG. 7B shows an enlarged view of the seam region S(2) in FIG. 7A.

Step S662: Retrieve a selected decision group from the 2D error table. Referring to FIGS. 3C and 7B, since each control region normally adjoins two control regions, a selected control region along with its two control regions form a selected decision group to determine the optimal warping coefficient for a selected control region. For example, a selected control region R(9) along with R(8) and R(10) form a selected decision group. However, if a selected control region (such as R(1)) is located at top or bottom of the overlap region, then the selected control region R(1) form a selected decision group along with its single neighbor R(2) to determine its optimal warping coefficient C(1). For ease of description, the following steps are described with the assumption that R(2) is selected and forms a selected decision group along with R(3) and R(1) to determine its optimal warping coefficient C(2).

Step S664: Determine local minimums among the region errors for each control region in the selected decision group. Table 4 is an example showing the region errors and the test warping coefficients of R(1)~R(3).

TABLE 4

| index | test warping coefficient | region error in R(1) | region error in R(2) | region error in R(3) |
|---|---|---|---|---|
| 1 | 0.96 | 1010 | 2600(*) | 820 |
| 2 | 0.97 | 1005 | 2650 | 750 |
| 3 | 0.98 | 1000 | 2800 | 700 |
| 4 | 0.99 | 900 | 3000 | 600(*) |
| 5 | 1.00 | 800(*) | 2700 | 650 |
| 6 | 1.01 | 850 | 2500 | 580 |
| 7 | 1.02 | 950 | 2400(*) | 500(*) |
| 8 | 1.03 | 960 | 2820 | 700 |
| 9 | 1.04 | 975 | 2900 | 800 |

As shown in Table 4, there is one local minimum among the nine region errors of R(1), and there are two local minimums among the nine region errors of R(2) and R(3), where each local minimum is marked with an asterisk.

Step S666: Choose candidates according to the local minimums. Table 5 shows candidates selected from the local minimums in Table 4, where ID denotes the index, WC denotes the warping coefficient and RE denotes the region error. The number of candidates is equal to the number of the local minimums in Table 4.

TABLE 5

|  | R(1) | | | R(2) | | | R(3) | | |
|---|---|---|---|---|---|---|---|---|---|
| Number of local minimums | 1 | | | 2 | | | 2 | | |
|  | ID | WC | RE | ID | WC | RE | ID | WC | RE |
| Candidate [0] | 5 | 1.00 | 800 | 1 | 0.96 | 2600 | 4 | 0.99 | 600 |
| Candidate [1] |  |  |  | 7 | 1.02 | 2400 | 7 | 1.02 | 500 |

Figure 6C:
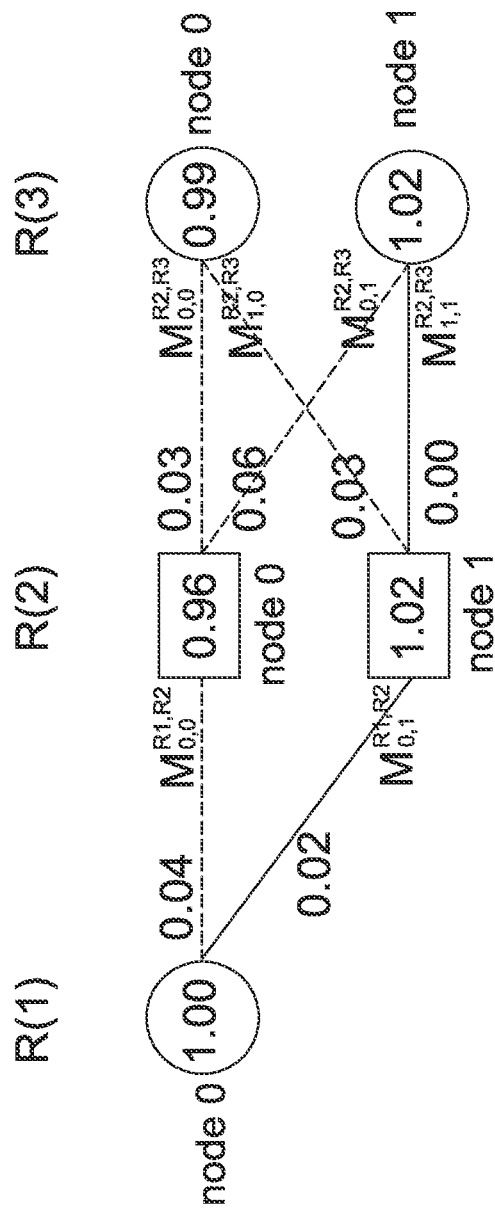
FIG. 6C shows an exemplary link metric.

Step S668: Build a link metric according to the candidates in Table 5. As shown in FIG. 6C, a link metric is built according to the candidates in Table 5.

Step S670: Determine the minimal sum of link metric values among the paths. For the link metric values $M_{0,0}^{R2,R3}=0.03$ and $M_{0,1}^{R2,R3}=0.06$, their minimum value $d_0^{R2,R3}=\min(M_{0,0}^{R2,R3},M_{0,1}^{R2,R3})=0.03$. For the link metric values $M_{1,0}^{R2,R3}=0.03$ and $M_{1,1}^{R2,R3}=0.00$, their minimum value $d_1^{B1,A4}=\min(M_{1,0}^{R2,R3},M_{1,1}^{R2,R3})=0.00$. Then, respectively compute sums of link metric values for path 0-0-0 and path 0-1-1 as follows: $S_0^{R2}=d_0^{R1,R2}+d_0^{R2,R3}=0.04+0.03=0.07$ and $S_1^{R2}=d_1^{R1,R2}+d_1^{R2,R3}=0.02+0.00=0.02$. Since $S_0^{R2}>S_1^{R2}$, it is determined that $S_1^{R2}$ (for path 0-1-1) is the minimal sum of link metric values among the paths as the solid-line path shown in FIG. 6C.

Step S672: Determine an optimal warping coefficient for the selected control region. As to the example given in step S670, since $S_1^{R2}$ (for path 0-1-1) is the minimal sum of link metric values among the paths, 1.02 is selected as the optimal warping coefficient of region R(2). However, if two or more paths have the same sum at the end of calculation, the warping coefficient of the node with minimum region error is selected for the selected control region. Here, the Q2 number of iterations is incremented by 1.

Step S674: Determine whether the Q2 number of iterations reaches a limit value of 20. If YES, the flow is terminated; otherwise, the flow goes to Step S662 for a next control region.

Through the specification and claims, the following notations/terms take the meanings explicitly associated herein, unless the context clearly dictates otherwise. The term "face image" refers to an image derived from a projection (such as equirectangular projection, cylindrical projection, Miller projection, Mercator projection, Lambert cylindrical equal area projection or Pannini projection) of a corresponding lens image from the image capture module 21. The term "seam region" refers to a region located between two neighboring main images (i.e., a first main image and a second main image) in a projection image and overlapped by a seam_A image and a seam_B image; the first main image and the seam_A image are a part of a first face image, and the second main image and the seam_B image are a part of a second face image; the first face image and the second face image are adjacent. Normally, each face image is split into three parts for subsequent stitching operations. For example, in FIG. 7A, a first part of the left_face image located inside the seam region S(2) (or located on the right side of the left_main image) is called "seam_A image", a second part of the left_face image located inside the seam region S(1) (or located on the left side of the left_main image) is called "seam_B image" while the third part of the left_face image located between the seam regions S(1) and S(2) is called "left main image". The same division is also applicable to the front_face, the right_face and the back_face images.

FIG. 7A shows an example of an equirectangular panoramic image comprising four main images and four seam regions. FIG. 7B shows an enlarged view of a seam region S(2) in FIG. 7A. The quadrilaterals 72 in FIG. 7B corresponds to the quadrilaterals in polygon mesh in FIG. 3B and the intersections 71 of the quadrilaterals 72 are the locations of vertices. The sizes of the overlap regions (e.g., A(1)~A(4) in FIG. 1B) are varied according to the FOVs of the lenses, the resolutions of lens sensors and the lens angles arranged in the image capture module 21. A number P1 of control regions are located inside one seam region and the one seam region is located inside a corresponding overlap region, where P1>=3. Normally, the width of the overlap region is greater than or equal to the width of the seam region, and the width of the seam region is greater than or equal to the width of the P1 control regions. For example, the seam region S(2) is located inside the overlap region A(2) (not shown), the width of A(2) is greater than or equal to the width of S(2), and the width of the seam region S(2) is greater than or equal to the width of R(6)~R(10). In a preferred embodiment, the widths of the overlap region (e.g., A(2)), the seam region (e.g., S(2)) and the control regions (e.g., R(6)~R(10)) are in the ratio of 7:5:1. In an alternative embodiment, the widths of the overlap region (e.g., A(2)), the seam region (e.g., S(2)) and the control regions (e.g., R(6)~R(10)) are in the ratio of 9:7:1, 9:9:1, 9:5:1, 7:7:1, or 5:5:1.

In order to generate the equirectangular panoramic image in FIG. 7A, four face images are generated by the graphics engine 56 according to an equirectangular projection of four lens images from the image capture module 21. In actual implementations, a total of nine images, i.e., a chief image (including the back, the left, the front and the right main images) and eight (=4×2) seam images (including four seam_A images and four seam_B images), are generated in connection with the four face images. Thus, to facilitate the storage of the nine images in nine different buffers for subsequent stitching operations, in render mode, the correspondence generator 23 generates (m1+8) original one-lens vertex lists, i.e., m1 original main vertex lists and eight original seam vertex lists respectively corresponding to the four main images and the eight seam images, where 1<=m1<=4. For example, if m1=1, one original main vertex list is used to generate the four main images at a time; if m1=2, each of two original main vertex lists is used to generate two of the four main images at a time; if m1=4, each of four original main vertex lists is used to generate one of the four main images at a time. Correspondingly, to minimize the mismatch image defects caused by shifted lens centers of the image capture module 21, based on the (m1+8) original one-lens vertex lists and the twenty optimal warping coefficients C(1)~C(20), the vertex processing device 210 respectively generates (m1+8) modified one-lens vertex lists, i.e., m1 modified main vertex lists and eight modified seam vertex lists respectively corresponding to the four main images and the eight seam images. Please note that each of the (m1+8) original one-lens vertex lists has the format similar to Table 1, but only includes a single set of parameters for a single lens image, i.e., $ID_k$, $(u_k, v_k)$, $(idx_{k0}, idx_{k1})$ and $Alpha_k$, where k=0, 1, 2, or 3. Please also note that each of the (m1+8) modified one-lens vertex lists has the format similar to Table 2, but only includes a single set of parameters for a single lens image, i.e., $ID_k$ and $(u'_k, v'_k)$, where k=0, 1, 2, or 3.

In rendering mode, the graphics engine 56 performs rasterization and texture mapping according to the m1 modified main vertex list and the four lens images to generate the chief image, including the back, the left, the front and the right main images. Afterward, the graphics engine 56 "sequentially" performs rasterization and texture mapping according to the eight modified seam vertex lists and the four lens images to generate four seam_A images and four seam_B images, i.e., generating one seam image at a time. For example, the graphics engine 56 performs rasterization and texture mapping to generate a seam_A image related to the front_face image at a time according to a corresponding modified seam vertex list and the front lens image. In an alternative embodiment, the image generation sequence may be carried out by the graphics engine 56 in reversed order, i.e., the eight seam images first and then the chief image.

In a special case that the image capture module 21 includes a wide-angle camera, each of the leftmost face image and the rightmost face image in the equirectangular projection image would consist of a main image and a seam image only, i.e., one of the seam_A image and seam_B image being merged into the main image in each of the leftmost face image and the rightmost face image. For example, if the image capture module 21 comprises a two-lens wide-angle camera (e.g., 180°×60°) and generates a left and a right lens images, the graphics engine 56 would generate one chief image (including a left main image and a right main image), one seam_A image and one seam_B image for a single seam region according to the two lens images, one or two modified main vertex lists and two modified seam vertex lists. Finally, the image processing apparatus 220 forms a wide-angle image according to the chief image, the seam_A image and the seam_B image.

Figure 7C:
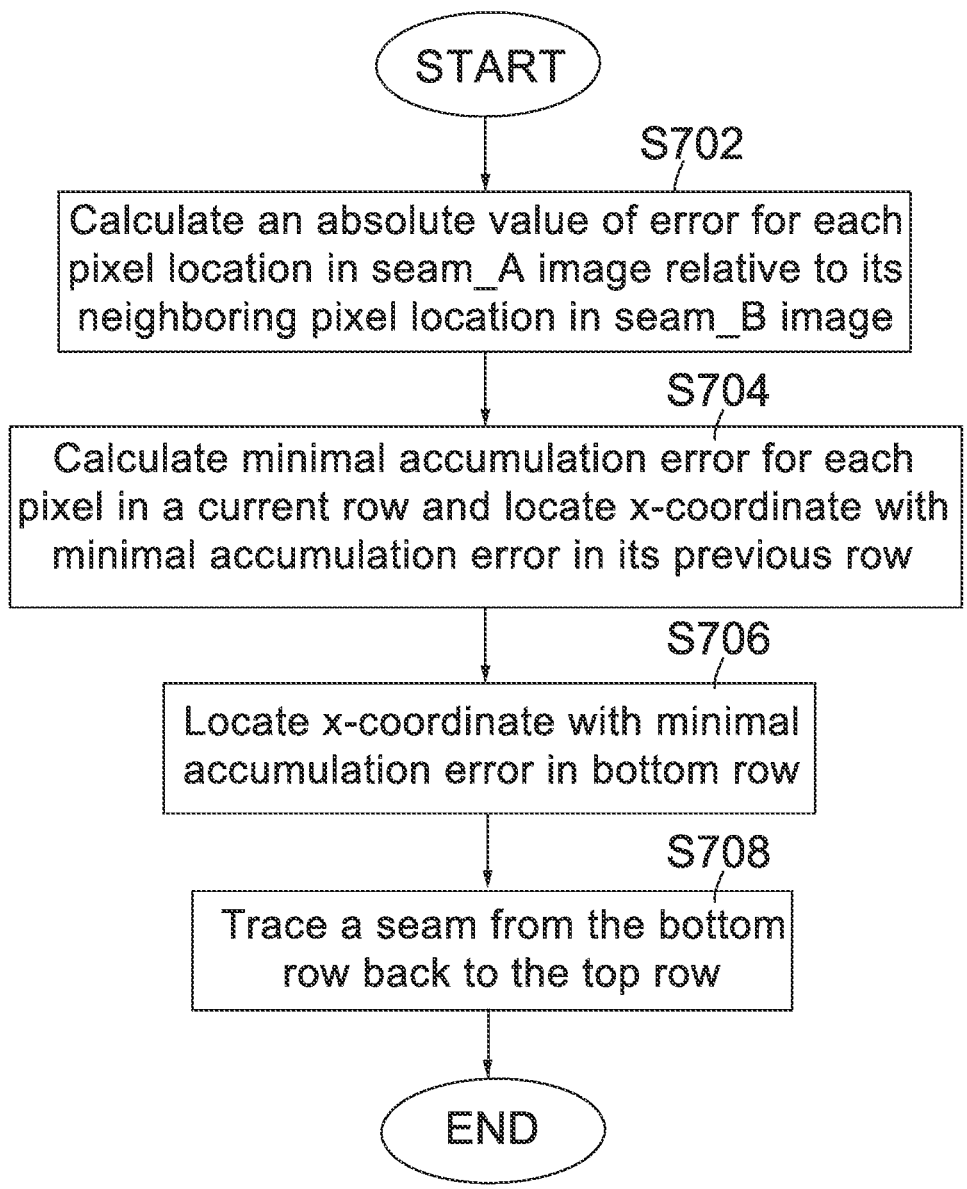
FIG. 7C is a flow chart showing a method of determining a minimum error path (or a seam) for a seam region according to an embodiment of the invention.

FIG. 7C is a flow chart showing a method of determining a minimum error path (or a seam) for a seam region according to an embodiment of the invention. Hereinafter, the method of determining a minimum error path for a seam region (performed by the seam engine 55 of the image processing device 220 in render mode) is described with reference to FIGS. 5 and 7A-7D.

For descriptive convenience, coordinates (x, y) refer to a pixel location in an equirectangular projection domain.

Step S702: Calculate an absolute value of either an error or a pixel value difference for each pixel location in the seam_A image relative to its neighboring pixel location in the seam_B image in the same seam region. In an embodiment, the following program codes are provided to calculate the absolute value |A(x,y)−B(x+1,y)| of a pixel/sample difference for each pixel (x, y) relative to its neighboring right pixel (x+1, y) in the same seam region ranging from Y0 to Y1 and X0 to X1, where A(x, y) denotes a pixel value in the location (x,y) of the seam_A image related to a first face image and B(x+1, y) denotes a pixel value in the location (x+1,y) of the seam_B image related to a second face image. Please note that the two pixels A(x, y) and B(x+1, y) are required to be in the same row y, and the first and the second face images are overlapping in the seam region.

```
for (y=Y0; y<=Y1; y++) {
    for (x=X0; x<=X1; x++) {
        Err[y][x] = |A(x,y) − B(x+1,y)|; // the array Err[y][x] store the absolute
value of the pixel value difference for each pixel A(x, y) relative to its
neighboring right pixel B(x+1, y)
    }
}
```

In an alternative embodiment, instead of the absolute value of the error or a pixel value difference, a squared error for each pixel A(x, y) relative to its neighboring right pixel B(x+1, y) is calculated in the same seam region.

Step S704: Calculate the minimal accumulation error (or minimal sum of absolute values of pixel value differences) for each pixel in a current row and locate x-coordinate with the minimal accumulation error in its previous row of the seam region. In an embodiment, the following program codes are provided to calculate the minimal accumulation error for each pixel in a current row y and locate x coordinate with the minimal accumulation error in its previous row (y−1) of the seam region.

```
for (x=X0; x<=X1; x++) {
    AccErr[Y0][x] = Err[Y0][x]; //initialize the top row of the array "AccErr"
    Label[Y0][x] = x; //initialize the top row of the array "Label"
}
for(y=Y0+1; y<=Y1; y++) { //from row (Y0+1) to rowY1
    for (x=X0; x<=X1; x++) {
        MinErr= 1000000; //large enough number
        for (i=0; i<RR; i++) { //RR denotes a search range for minimal
                accumulation error
            p = (i%2) ? (−(i+1)/2): (i/2);
            x2 = x + p; // x2 is the x-coordinate in equirectangular domain
            if (x2<X0 || x2>=X1) // x2 is out of range
                continue; //skip the remaining part of this loop
            if (i==0 || AccErr[y−1][x2] < MinErr) {
                MinErr = AccErr[y−1][x2]; //update the minimal accumulation
error in previous row (y−1)
                idx = x2; // update the x-coordinate with the minimal
accumulation error in the previous row (y−1)
            }
        }
        AccErr[y][x] = Err[y][x] + MinErr; // update AccErr[y][x] with the
            minimal accumulation error plus the current error
        Label[y][x] = idx; // update Label[y][x] with the x-coordinate
having the minimal accumulation error in the previous row (y−1)
    }
}
```

Step S706: Locate x-coordinate with the minimal accumulation error in the bottom row of the seam region. In an embodiment, the following program codes are provided to locate x-coordinate with the minimal accumulation error in the bottom row of the seam region.

```
MinErr = 1000000; // large enough number
for (x=X0; x<=X1; x++) {
   if (x==X0 || AccErr[Y1][x] < MinErr) {
      MinErr = AccErr[Y1][x]; //search for the minimal accumulation error
in the bottom row
      sep = x; // update "sep" with x-coordinate having the minimal
accumulation error
   }
}
```

Figure 7D:
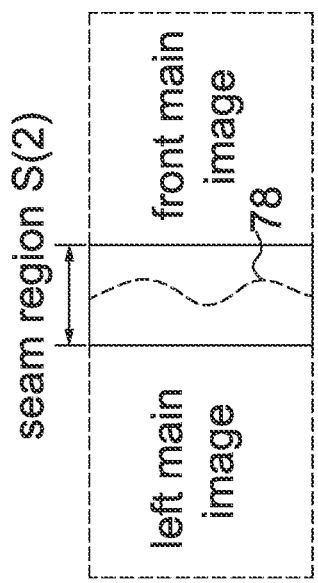
FIG. 7D shows an example of a seam 78 located within a seam region between a left main image and a front main image.

Step S708: Trace a minimum error path (i.e., a seam) from the bottom row back to the top row of the seam region. The seam 78 will traverse the seam region and have one pixel location (i.e., x-coordinate) per row as shown in FIG. 7D. Here, the seam 78 is a series of separation points (or seam cut points) of all the rows of the seam region. In an embodiment, the following program codes are provided to form a seam of the seam region.

```
for (y=Y1; y>=Y0; y--) {
   Seam[y] = sep;    // the initial value for "sep" is the x-coordinate
having the minimal accumulation error in the bottom row
   sep = Label[y][sep];
}
```

At the end of this step, the array Seam[y] would include x coordinates of all separation points of all rows (Y0~Y1), i.e., the minimum error path (i.e., the seam), in the seam region. In an alternative embodiment, people skilled in the art may properly modify the contents of steps S704~S708 so that the seam of the seam region is formed in a reverse order, i.e., from the top row down to the bottom row of the seam region. This also falls within the scope of the invention.

Figure 8A:
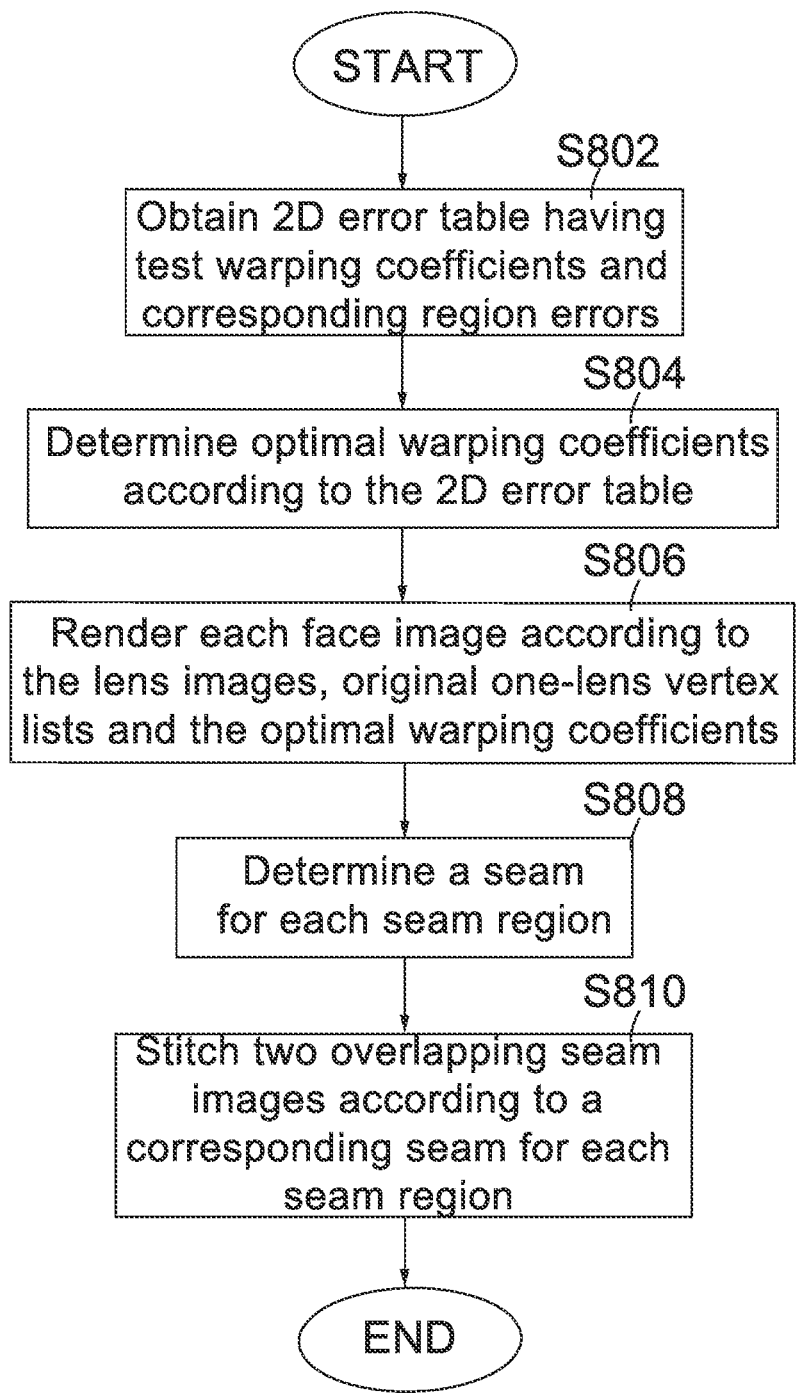
FIG. 8A is a flow chart showing an image processing method according to an embodiment of the invention.

FIG. 8A is a flow chart showing an image processing method according to an embodiment of the invention. Hereinafter, the image processing method of the invention, applicable to the projection image processing system 200, is described with reference to FIGS. 2, 5 and 8A-8D.

Step S802: Obtain a 2D error table for all the test warping coefficients and their corresponding region errors of all control regions. Please refer back to the steps S602~S610 in FIG. 6A. At the end of this step, the 2D error table (e.g., Table 3) including all the test warping coefficients and the corresponding region errors E(1)~E(20) of all control regions R(1)~R(20) is obtained. Please note that all the test warping coefficients are related to the offset ofs that a lens center 46 is separated from the system center 43 in the image capture module 21 as shown in FIG. 4B.

Step S804: Determine optimal warping coefficients for all control regions according to the 2D error table and the four lens images. Please refer back to the steps S612~S614 in FIG. 6A and the steps S661~S674 in FIG. 6B. At the end of this step, the optimal warping coefficients C(1)~C(20) for all control regions R(1)~R(20) are obtained and sent to the vertex processing device 210; the measure mode is terminated and the render mode starts.

Step S806: Render each face image according to multiple lens images, multiple original one-lens vertex lists and the optimal warping coefficients obtained in step S804. As set forth above, the vertex processing device 210 sequentially generates multiple modified one-lens vertex lists (including at least one modified main vertex list and multiple modified seam vertex lists) according to multiple original one-lens vertex lists (including at least one original main vertex list and multiple original seam vertex lists) from the correspondence generator 23 and the optimal warping coefficients obtained in step S804. In the example of the equirectangular panoramic image with four seam regions in FIG. 7A, in render mode, the graphics engine 56 in FIG. 5 sequentially generates four face images (including four main images, four seam_B images and four seam_A images) according to the four lens images from the image capture module 21, (m1+8) modified one-lens vertex lists and the twenty optimal warping coefficients C(1)~C(20) obtained in step 804, where 1<=m1<=4. After the four face images are generated, there are two approaches for the graphics engine 56 to store nine images, including one chief image (including the four main images), the four seam_B images and the four seam_A images. Approach (a): First, all the nine images are stored in nine different temporary buffers 520 by the graphics engine 56, without overlapping. Then the chief image is transferred to a destination buffer 510, where four seam regions are void. Finally, four stitched seam images are generated by the seam engine 55 according to the four seam_A images and the four seam_B images and then stored into the four seam regions in the destination buffer 510 for display. Approach (b): The chief image is directly stored in the destination buffer 510 while the four seam_A images and the four seam_B images are respectively stored in eight different temporary buffers 520 by the graphics engine 56. Then the four seam_A images and the four seam_B images are stitched by the seam engine 55 to generate four stitched seam images to be stored back to the four seam regions in the destination buffer 510. For example, the seam_A image as a part of the left_face image and the seam_B image as a part of the front_face image are fed to the seam engine 55 for stitching to produce the stitched seam image to be stored back to the seam region S(2) in the destination buffer 510 as shown in FIG. 7A.

In the example that the image capture module 21 comprises a three-lens wide-angle camera and generates three lens images (i.e., a left, a front and a right lens images), the graphics engine 56 generates three face images (including one chief image (including three main images), two seam_A images and two seam_B images for two seam regions) according to the three lens images from the image capture module 21, at least five modified one-lens vertex lists and multiple optimal warping coefficients. After the five images (including the one chief image, the two seam_A images and the two seam_B images) are generated, the graphics engine 56 stores the five images by using one of the above two approaches (a) and (b) for subsequent stitching operations.

Step S808: Determine a minimal error path (i.e., a seam) for each seam region. In an embodiment, the method of determining a minimal error path for a seam region in FIG. 7C is performed over each of the four seam regions S(1)~S(4). At the end of this step, four minimal error paths for the four seam regions S(1)~S(4) are produced.

Step S810: Stitch a seam_A image and a seam_B image for each seam region according to its corresponding seam. In the example of FIG. 7D, the minimum error path (i.e., a seam) 78 is used to stitch the seam_A image related to the left_face image and the seam_B image related to the front_face image together to produce a stitched seam image. Finally, a total of four different stitched seam images are respectively stored back to the four seam regions S(1)~S(4) in the destination buffer 510 for the example of FIG. 7A and accordingly, the four different stitched seam images and the four main images form a complete equirectangular panoramic image.

Figure 8C:
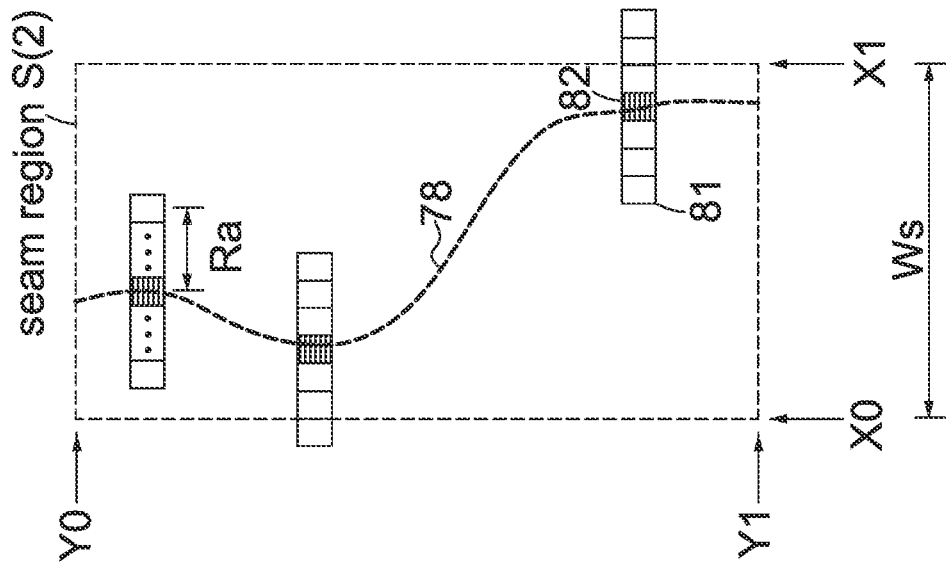
FIG. 8C is an example showing a dimension of a seam region and a dimension and different locations of update windows 81 in three rows.
Figure 8B:
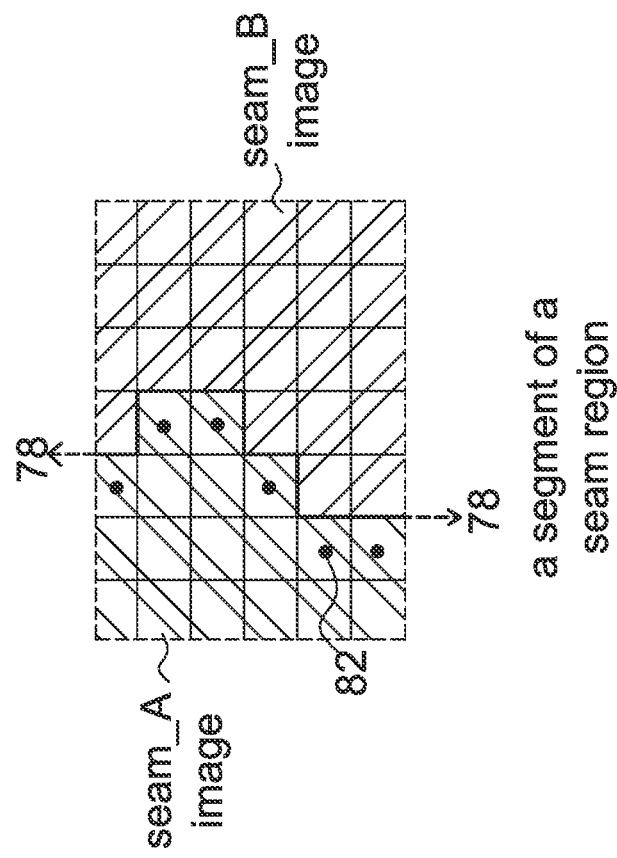
FIG. 8B depicts an exemplary segment of a stitched seam image associated with a seam 78, a seam_A image and a seam_B image.

FIG. 8B depicts an exemplary segment of a seam region (or a stitched seam image) associated with a seam 78, a seam_A image and a seam_B image. FIG. 8C is an example showing a dimension of a seam region and a dimension and different locations of update windows 81 applied to three rows. In step S810, three following approaches (1)~(3) are provided to stitch the seam_A image and the seam_B image to generate a corresponding stitched seam image. (1) Conventional approach: Stitch a seam_A image and a seam_B image for each seam region according to its corresponding seam. As shown in FIG. 8B, for each row of the stitched seam image or the seam region, if a pixel location (x, y) is on the left side of the seam 78, its pixel value in the seam_A image is assigned to the same pixel location (x, y) in the stitched seam image. Contrarily, if the pixel location (x, y) is on the right side of the seam 78, its pixel value in the seam_B image is assigned to the same pixel location (x, y) in the stitched seam image.

(2) Seam-blending approach (each seam region is an integral/continuous region without separation): Stitch seam_A and seam_B images for a seam region by applying an update window to each row of the seam region according to its corresponding seam. To smooth the pixel value transition near the seam 78, the seam-blending approach is provided to update the pixel values in an update window 81 with a width of 2×Ra and a separation point 82 (of the seam 78) located in the center of the update window 81 as the example shown in FIG. 8C. For each row of the seam region S(2), if a pixel location (x, y) is on the left side of the update window 81, its pixel value in the seam_A image is assigned to the same pixel location (x, y) in the stitched seam image; meanwhile, if a pixel location (x, y) is on the left side of the update window 81, its pixel value in the seam_B image is assigned to the same pixel location (x, y) in the stitched seam image. Moreover, if a pixel location (x, y) is inside the update window 81, calculate a blending weight according to the final width of the update window 81 and a distance of the pixel location from the left edge of the update window 81, and then calculate a blending pixel value at the same pixel location (x, y) in the stitched seam image according to the blending weight and two corresponding pixel values (i.e., ImgA(x, y) and ImgB(x,y)) in the seam_A and the seam_B images. In an embodiment, the following program codes are provided to update the pixel values in the update window 81 for each row of the stitched seam image according to the final width of the update window 81 and the position of each pixel location relative to the update window 81:

```
For (y=Y0; y<=Y1; y++){
    xL = Seam[y] − Ra; //find an absolute x-coordinate of left edge of update window
    if (xL<X0) xL = X0; // the left edge of the update window is limited to
    the left edge (X0) of the seam region
    xR = Seam[y] + Ra; // find an absolute x-coordinate of right edge of update window
    if (xR>X1) xR = X1; // the right edge of the update window is limited to
    the right edge (X1) of the seam region
    For (x=X0; x<=X1; x++){
        if x < xL // pixels located on the left side of the update window
            SImg(x,y) = ImgA(x,y); // update the pixel value SImg(x,y) in the
    stitched seam image with a corresponding pixel ImgA(x,y) in the seam_A
    image
            else if (x>xR) // pixels located on the right side of the update window
                SImg(x,y) = ImgB(x,y); // update the pixel value SImg(x,y) in the
    stitched seam image with a corresponding pixel ImgB(x,y) in the seam_B
    image
            else {
                w = (x − xL)/(xR − xL); // calculate a bending weight w according
    to the distance from the left edge of the update window and the final width
    of the update window
                SImg(x,y) = (1−w)*ImgA(x,y)+w*ImgB(x,y); // blend two pixel values
    ImgA(x,y) and ImgB(x,y) according to the blending weight w
            }
    }
}
```

Figure 8D:
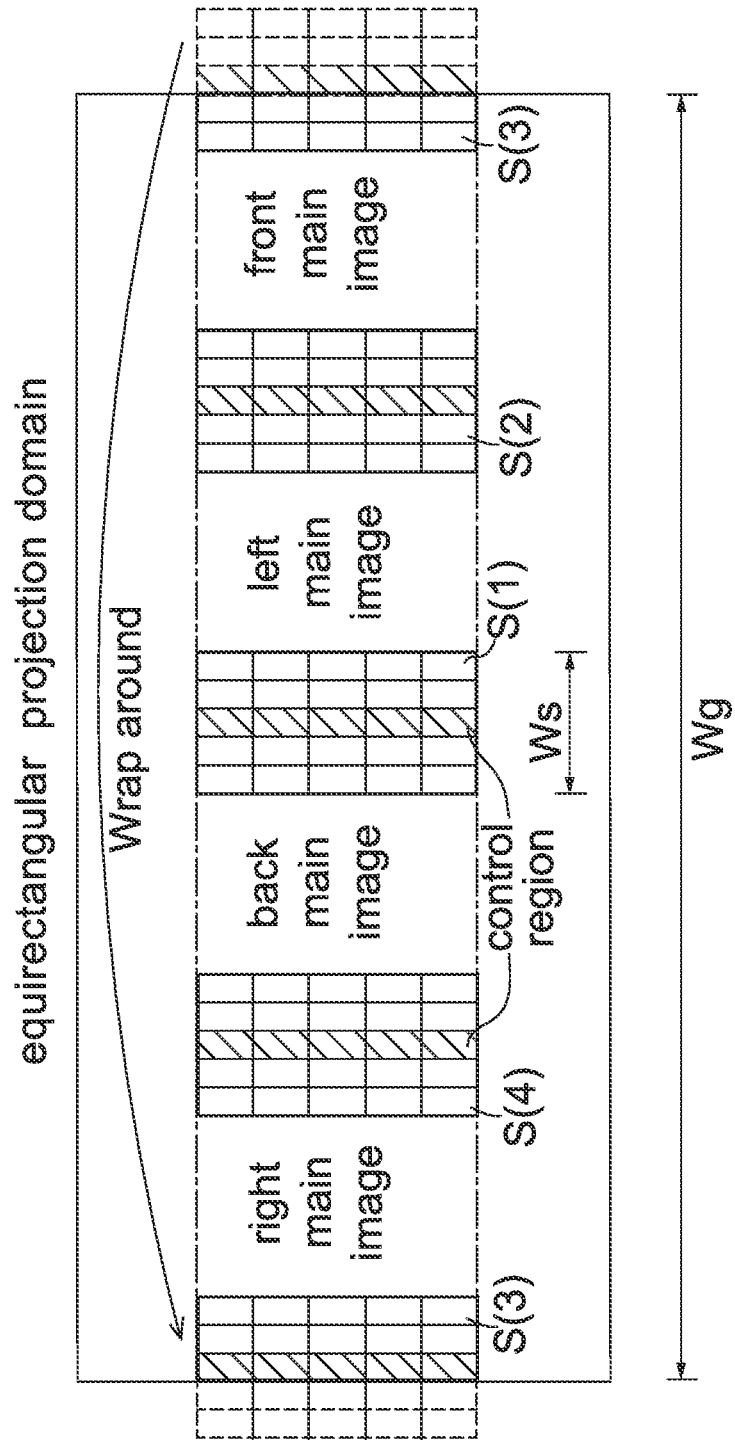
FIG. 8D is an example showing a seam region S(3) is located at the leftmost and the rightmost sides of the equirectangular projection domain.

(3) Seam-blending approach with wrap-around function (one of the seam regions is split into two separate parts on the opposite sides of the panoramic image): In a special case, a seam region is possibly located near the left edge and the right edge of the equirectangular panoramic image. As shown in the example of FIG. 8D, the seam region S(3) is located at the leftmost and the rightmost sides of the equirectangular projection domain at the same time. In other words, the seam region S(3) is split into two separate parts. To deal with this situation, a seam-blending approach with wrap-around function is provided. In an embodiment, the following program codes are provided to form a stitched seam image for a seam region ranging from Y0 to Y1 and X0 to X1 based on seam-blending approach with wrap-around function:

```
For (y=Y0; y<=Y1; y++){
   Ds = Seam[y]-X0; // X0 denotes the x-coordinate of the left edge of
the seam region; Seam[y] is an absolute x-coordinate; Ds denotes the
relative x-coordinate relative to the left edge of the seam region
   if (Ds < 0) Ds = Ds+Wg; //wrap-around; Wg is the width of the
panoramic image
   Dleft=Ds-Ra; //Dleft denotes the relative x-coordinate of the left edge
of a update window with 2*Ra;
   if (Dleft < 0) Dleft = 0;
   Dright = Ds + Ra; //Dright denotes the relative x-coordinate of the right
edge of a update window; the left and the right edges of the update window
are not allowed to stick out of the seam region
   if (Dright >= Ws) Dright = Ws-1; //Ws is the width of the seam region
   Dtotal = Dright - Dleft; //Dtotal denotes the final width of the
update window
   for (i=0; i<Dleft; i++){
   x = X0 + i;
   if (x >= Wg) x = x - Wg;//wrap-around
   SImg(x,y) = ImgA(x,y); // For a pixel location (x,y) on the left side of the
update window, update the pixel SImg(x,y) in the stitched seam image with
a corresponding pixel value ImgA(x,y) in the seam_A image
   }
      for (i=Dleft; i<=Dright; i++){
      x = X0 + i;
      if (x >= Wg) x = x - Wg; //wrap-around
      w = (i - Dleft)/Dtotal; // calculate a bending weight according to
the final width of the update window and the distance from the left edge of
the update window
      SImg(x,y) = (1-w)*ImgA(x,y) + w * ImgB(x,y); // Fora pixel location (x,y)
within the update window, update the pixel SImg(x,y) in the stitched seam
image with the blending pixel value
      }
      for (i=Dright+1; i<Ws; i++) {
      x = X0 + i;
      if (x >= Wg) x = x - Wg; //wrap-around
      SImg(x,y) = ImgB(x,y); // For a pixel location (x,y) on the right side of
the update window, update the pixel SImg(x,y) in the stitched seam image
with a corresponding pixel value ImgB(x,y) in the seam_B image
      }
}
```

Thus, even though the seam region S(3) in FIG. 8D is located at the leftmost and the rightmost sides of the equirectangular panoramic image, a correct stitched seam image would be produced by the seam-blending approach with wrap-around function.

The compensation device 22 and the correspondence generator 23 according to the invention may be hardware, software, or a combination of hardware and software (or firmware). An example of a pure solution would be a field programmable gate array (FPGA) design or an application specific integrated circuit (ASIC) design. In a preferred embodiment, the vertex processing device 210 and the image processing apparatus 220 are implemented with a graphics processing unit (GPU) and a first program memory; the correspondence generator 23 and the stitching decision unit 230 are implemented with a first general-purpose processor and a second program memory. The first program memory stores a first processor-executable program and the second program memory stores a second processor-executable program. When the first processor-executable program is executed by the GPU, the GPU is configured to function as: the vertex processing device 210 and the image processing apparatus 220. When the second processor-executable program is executed by the first general-purpose processor, the first general-purpose processor is configured to function as: the correspondence generator 23 and the stitching decision unit 230.

In an alternative embodiment, the compensation device 22 and the correspondence generator 23 are implemented with a second general-purpose processor and a third program memory. The third program memory stores a third processor-executable program. When the third processor-executable program is executed by the second general-purpose processor, the second general-purpose processor is configured to function as: the vertex processing device 210, the stitching decision unit 230, the correspondence generator 23 and the image processing apparatus 220.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image processing method for receiving M lens images and generating a projection image, comprising:
   determining P optimal warping coefficients of P control regions according to a 2D error table and the M lens images from an image capture module that captures a X-degree horizontal field of view and a Y-degree vertical field of view;
   generating M face images according to the M lens images, a first vertex list and the P optimal warping coefficients;
   determining a seam for each of N seam regions; and
   stitching two overlapping seam images for each seam region to generate a stitched seam image according to its corresponding seam;

wherein each face image comprises z seam images and a main image, and each seam region is located between two neighboring main images in the projection image;

wherein the 2D error table comprises multiple test warping coefficients and corresponding multiple accumulation pixel value differences in the P control regions;

wherein the P control regions are respectively located in the N seam regions that are respectively located in N overlap regions of the M face images;

wherein the first vertex list comprises a plurality of first vertices with their first data structures that define a first vertex mapping between a single lens image and the projection image, and wherein $1 \Leftarrow z \Leftarrow 2$, $M \geq 2$, $N \geq 1$, $P \geq 3$, $X \geq 360$ and $Y < 180$.

2. The method according to claim 1, further comprising:
forming the projection image according to N stitched seam images for the N seam regions and M main images.

3. The method according to claim 1, wherein the step of determining the P optimal warping coefficients comprises:
determining the test warping coefficients according to an offset of a lens center of the image capture module relative to its system center;
modifying texture coordinates of each lens image in a second data structure of each second vertex in a second vertex list according to the test warping coefficients to generate a third vertex list;
measuring the accumulation pixel value differences in the P control regions according to the third vertex list and the M lens images;
repeating the steps of modifying and measuring until all the test warping coefficients are processed to form the 2D error table; and
determining the optimal warping coefficient for each control region according to at least one local minimum among the accumulation pixel value differences of its one or two closest control regions in the 2D error table;
wherein the second vertex list comprises multiple second vertices with their second data structures that define a second vertex mapping between the M lens images and the projection image; and
wherein the third vertex list comprises multiple third vertices with their third data structures that define a third vertex mapping between the M lens images and the projection image.

4. The method according to claim 1, wherein each of the M face images is derived from a predefined projection of a corresponding lens image from the image capture module.

5. The method according to claim 4, wherein the predefined projection is one of equirectangular projection, cylindrical projection, Miller projection, Mercator projection, Lambert cylindrical equal area projection and Pannini projection.

6. The method according to claim 1, wherein if z=2, the main image is located between the z seam images for each face image.

7. The method according to claim 1, wherein the first vertex list comprises m1 first main vertex list and 2×N first seam vertex list and the step of generating the M face images comprises:
sequentially modifying texture coordinates of the single lens image for all the first vertices in the first vertex list to generate a fourth vertex list comprising m1 second main vertex list and 2×N second seam vertex list according to the P optimal warping coefficients, where $1 \Leftarrow m1 \Leftarrow M$; and performing rasterization and texture mapping for each point within each polygon formed by each group of fourth vertices from the fourth vertex list to sequentially generate M main images, N first seam images and N second seam images according to the M lens images;
wherein each of the m1 first main vertex list and the 2×N first seam vertex list comprises the first vertices with their first data structures that define the first vertex mapping between the single lens image and the projection image; and
wherein each of the m1 second main vertex list and the 2×N second seam vertex list comprises fourth vertices with their fourth data structures that define a fourth vertex mapping between a corresponding lens image and the projection image.

8. The method according to claim 7, wherein the step of modifying the texture coordinates further comprises:
modifying the texture coordinates for the single lens image in the first data structure of each first vertex according to two warping coefficient indices and a blending weight for the single lens image in the first structure of each first vertex and the optimal warping coefficients to generate the fourth vertex list;
wherein the two warping coefficient indices are used to select two coefficients from the optimal warping coefficients and the blending weight is used to blend the two selected coefficients.

9. The method according to claim 8, wherein the step of modifying the texture coordinates further comprises:
calculating an interpolated warping coefficient in the single lens image for a target first vertex according to the two warping coefficient indices and the blending weight in the first data structure of the target first vertex and the optimal warping coefficients;
calculating modified texture coordinates in the single lens image for the target first vertex according to the interpolated warping coefficient and the texture coordinates of the target first vertex in the first data structure of the target first vertex; and
storing the modified texture coordinates in the single lens image for the target first vertex in the fourth data structure of a corresponding fourth vertex in the fourth vertex list.

10. The method according to claim 7, wherein the step of generating the M face images further comprises:
storing the M main images in a first buffer for display; and
storing the N first seam images and the N second seam images in 2×N different second buffers separate from the first buffer.

11. The method according to claim 7, wherein the step of generating the M face images further comprises:
storing the M main images, the N first seam images and the N second seam images in (m2+2×N) different first buffers; and
transferring the M main images to a second buffer for display, where $m2 \Leftarrow M$.

12. The method according to claim 1, wherein the step of determining the seam for each of the N seam regions comprises:
calculating a pixel value difference for each first pixel location in a third seam image relative to a corresponding second pixel location in a fourth seam image of a desired seam region to store the pixel value difference in a fifth data structure, wherein each first pixel location and the corresponding second pixel location are adjacent in the same row;

according to the fifth data structure and a predefined search range, calculating a minimal accumulation pixel value difference for each first pixel location in a current row y of the desired seam region to store the minimal accumulation pixel value difference in a sixth data structure, and locating a x coordinate with the minimal accumulation pixel value difference in its previous row (y−1) to store the x coordinate in a seventh data structure;

according to the sixth data structure, locating a x coordinate with the minimal accumulation pixel value difference in a bottom row of the desired seam region; and traversing from the x coordinate with the minimal accumulation pixel value difference in the bottom row back to a top row of the desired seam region according to the seventh data structure to form the seam of the desired seam region and store the traversed x coordinates of all the rows of the desired seam region in a eighth data structure.

13. The method according to claim 1, wherein the two overlapping seam images comprises a fifth seam image related to a first one of the M face images, and a sixth seam image related to a second one of the M face images, wherein the main images of the first one and the second one of the M face images are respectively located on the left side and the right side of a corresponding seam region, and wherein the seam of the corresponding seam region comprises multiple separation points, each of which is located at one row of the corresponding seam region.

14. The method according to claim 13, wherein the step of stitching the two overlapping seam image comprises:
for each row of the corresponding seam region,
assigning a pixel value to a pixel location in the stitched seam image according to the fifth seam image, the sixth seam image and relative positions of the pixel location and its corresponding separation point in the same row.

15. The method according to claim 14, wherein the step of assigning the pixel value comprises:
if the pixel location is on the left side of the seam, assigning its pixel value in the fifth seam image to the same pixel location in the stitched seam image;
if the pixel location is on the right side of the seam, assigning its pixel value in the sixth seam image to the same pixel location in the stitched seam image; and
if the pixel location is at the seam, assigning a corresponding pixel value in one of the fifth seam image and the sixth seam image to the same pixel location in the stitched seam image.

16. The method according to claim 13, wherein the step of stitching the two overlapping seam images comprises:
stitching the two overlapping seam images by applying an update window to each row of the corresponding seam region to generate the stitched seam image according to its corresponding seam and whether one of the N seam regions is split into two separate portions;
wherein each separation point is located in the center of the update window for each row of the corresponding seam region.

17. The method according to claim 16, wherein the step of stitching the two overlapping seam images comprises:
for each row of the corresponding seam region,
if a pixel location is between the left edge of the seam region and the left edge of the update window, assigning its pixel value in the fifth seam image to the same pixel location in the stitched seam image; and
if the pixel location is between the right edge of the seam region and the right edge of the update window, assigning its pixel value in the sixth seam image to the same pixel location in the stitched seam image; and
if the pixel location is inside the update window, calculating a blending weight according to a final width of the update window and a distance of the pixel location from the left edge of the update window, and calculating a blending pixel value at the same pixel location in the stitched seam image according to the blending weight and corresponding pixel values of the same pixel location in the fifth and the sixth seam image.

18. The method according to claim 17, wherein each seam region is an integral region and the step of stitching the two overlapping seam images further comprises:
prior to the steps of assigning its pixel value and calculating the blending weight and the blending pixel value,
for each row of the corresponding seam region,
determining locations of a left edge and a right edge of the update window according to an initial width of the update window; and
if one of the left edge and the right edge of the update window is sticked out of the corresponding seam region, modifying the width of the update window and the one of the left edge and the right edge of the update window to align with the boundary of the corresponding seam region to obtain the final width of the update window.

19. The method according to claim 17, wherein the one of the N seam regions is split into two separate portions and the two separate portions are respectively located at the leftmost and rightmost sides of the projection image, wherein the step of stitching the two overlapping seam images further comprises:
prior to the steps of assigning its pixel value and calculating the blending weight and the blending pixel value,
for each row of the corresponding seam region,
subtracting a x coordinate of the left edge of the corresponding seam region from a x coordinate of a corresponding separation point to obtain a relative distance of the corresponding separation point;
if the relative difference is less than zero, adding the width of the projection image to the relative distance to modify the relative difference;
determining locations of a left edge and a right edge of the update window according to the relative distance and a width of the update window;
if one of the left edge and the right edge of the update window is sticked out of the corresponding seam region, modifying the width of the update window and the one of the left edge and the right edge of the update window to align with the boundary of the corresponding seam region to obtain the final width of the update window;
calculating a distance of a pixel location in the corresponding seam region from the left edge of the projection image; and
if the distance of the pixel location is greater than the width of the projection image, subtracting the width of the projection image from the distance of the pixel location to modify the pixel location.

20. The method according to claim 1, wherein each seam region comprises P1 control regions arranged in one column, where $P1 \geq 3$.

21. The method according to claim 20, wherein for the P1 control regions in one seam region located in one overlap region, a width of the one overlap region is greater than or equal to a width of the one seam region and the width of the one seam region is greater than or equal to a width of the P1 control regions.

22. The method according to claim 1, wherein the projection image is one of a panoramic image and a wide-angle image.

\* \* \* \* \*